United States Patent [19]
Nakano et al.

[11] Patent Number: 5,507,554
[45] Date of Patent: Apr. 16, 1996

[54] SAFETY SEAT AND SAFETY ARRANGEMENT OF SEATS

[75] Inventors: Nobuyuki Nakano, Ayase; Nobuhiko Takahashi, Yokohama, both of Japan

[73] Assignee: Ikeda Bussan Co., Ltd., Ayase, Japan

[21] Appl. No.: 321,847

[22] Filed: Oct. 14, 1994

Related U.S. Application Data

[62] Division of Ser. No. 48,205, Apr. 20, 1993, Pat. No. 5,407,244.

[30] Foreign Application Priority Data

Apr. 24, 1992 [JP] Japan .................................. 4-106906
Apr. 27, 1992 [JP] Japan .................................. 4-107484
Jun. 22, 1992 [JP] Japan .................................. 4-163062

[51] Int. Cl.⁶ ...................................................... B60N 2/42
[52] U.S. Cl. ................................. 297/216.13; 297/452.20
[58] Field of Search ........................ 297/216.1, 216.13, 297/452.18, 452.20; 296/68.1

[56] References Cited

U.S. PATENT DOCUMENTS

| | | | |
|---|---|---|---|
| 4,512,604 | 4/1985 | Maeda et al. | 296/68.1 |
| 4,575,153 | 3/1986 | Aoki | 297/452.2 |
| 4,938,527 | 2/1990 | Schmale et al. | 297/216.13 |
| 5,318,341 | 6/1994 | Griswold et al. | 297/216.13 X |

FOREIGN PATENT DOCUMENTS

| | | |
|---|---|---|
| 2816318 | 10/1978 | Germany . |
| 61-35017 | 8/1986 | Japan . |
| 3-26652 | 3/1991 | Japan . |

*Primary Examiner*—Peter R. Brown
*Attorney, Agent, or Firm*—Foley & Lardner

[57] ABSTRACT

In a motor vehicle, there are arranged abreast first and second seats. Each seat includes a seat cushion, a seatback pivotally connected to the seat cushion, and a power reclining device for pivoting the seatback to a desired angular position. A load transmitting center structure is mounted on the vehicle floor between the first and second seats. A manual switch is used which, when operated, pivots the seatback of the second seat to a desired angular position. At least the second seat has a reinforcing structure installed therein. The reinforcing structure exhibits the maximum performance in cooperation with the load transmitting center structure when the seatback of the second seat is within a given angular range. A computer-aided control device is used, which limits the angular position of the seatback of the second seat to the given angular range when the second seat carries thereon a seat occupant, and pivots the seatback of the second seat to an angular position coincident with that taken by the seatback of the first seat when the second seat carries thereon no seat occupant.

11 Claims, 26 Drawing Sheets

FIG. 6

| POSITION OF SEATBACK | S.O.D.M. 81 | E.O.D.M. 82 | M.S. 83 | A.S. 84 | P.L.S. 85 |
|---|---|---|---|---|---|
| — | OFF | OFF | OFF | OFF | OFF |
| COINCIDENT POSITION | OFF | ON | ON | ON | OFF |
| GIVEN RANGE (θ) | ON | ON | ON | ON | ON |

SAFETY SEAT AND SAFETY ARRANGEMENT OF SEATS

This application is a divisional of application Ser. No. 08/048,205 filed Apr. 20, 1993 now U.S. Pat. No. 5,407,244.

BACKGROUND OF THE INVENTION

1. Field of the Invention

The present invention relates in general to safety seats, and more particularly to safety seats for automobiles, which can protect seat occupants even when an associated motor vehicle encounters a side-on collision or the like. More specifically, the present invention is concerned with safety seats and safety arrangements of automotive seats.

2. Description of the Prior Art

In order to protect seat occupants upon a side-on vehicle collision, various seats have been hitherto proposed and put into practical use, some of which are disclosed in Japanese Patent Second Provisional Publication 61-35017 and Japanese Utility Model First Provisional Publication 3-26652.

In these disclosed seats, so-called "reinforcing members" are employed which are installed in the seat cushions and/or seatbacks to reinforce them. With these reinforcing members, the mechanical strength of the seats is increased, so that even when the associated motor vehicle is subjected to side-on vehicle collision, the seats are prevented from a severe damage thereby to protecting the seat occupants.

However, due to their inherent construction, such reinforced seats have sometimes failed to exhibit satisfactory performance against a Severe side-on vehicle collision. Furthermore, due to presence of the reinforcing members therein, some of such reinforced seats have failed to provide seat occupants with a comfortable sitting feeling.

Furthermore, hitherto, the safety arrangement of such safety seats in a motor vehicle has been given little thought.

SUMMARY OF THE INVENTION

It is therefore an object of the present invention to provide a safety seat and a safety arrangement of seats which can assuredly protect a seat occupant or seat occupants even when an associated motor vehicle is subjected to a side-on vehicle collision.

According to a first aspect of the present invention, there is provided a seat arrangement in a motor vehicle having a vehicle floor. The seat arrangement comprises first and second seats arranged abreast on the vehicle floor, each seat including a seat cushion, a seatback pivotally connected to the seat cushion, and a power reclining device for pivoting the seatback to a desired angular position relative to the seat cushion with the aid of electric power; a load transmitting center structure mounted on the vehicle floor between the first and second seats; a manual switch which, when operated, pivots the seatback of the second seat to a desired angular position with the aid of electric power; a reinforcing structure installed in the second seat, the reinforcing structure exhibiting the maximum performance in cooperation with the load transmitting center structure when the seatback of the second seat is within a given angular range; and control means for limiting the angular position of the seatback of the second seat to the given angular range when the second seat carries thereon a seat occupant and for pivoting the seatback of the second seat to an angular position coincident with that taken by the seatback of the first seat when the second seat carries thereon no seat occupant.

According to a second aspect of the present invention, there is provided a safety seat which comprises a seat cushion including a seat cushion frame; a seatback pivotally connected to a rear end of the seal cushion, the seatback including a seatback frame; a reclining device for permitting the seatback to assume a locked desired angular position relative to the seat cushion, the reclining device including an inside-positioned part and an outside-positioned part which are arranged at both sides of the rear end of the seat cushion; and an elongate reinforcing structure secured to at least one of the seat cushion frame and the seatback frame, the reinforcing structure having axial ends which face the inside-positioned and outside-positioned parts respectively.

BRIEF DESCRIPTION OF THE DRAWINGS

Other objects and advantages of the present invention will become apparent from the following description when taken in conjunction with the accompanying drawings, in which:

FIGS. 1 to 7 are drawings showing a first embodiment of the present invention, in which:

FIG. 1 is a perspective view of a driver's seat and an assistant driver's seat, to which the present invention is applied;

FIG. 2 is a block diagram of a control system which controls the safety seat arrangement of the first embodiment;

FIG. 3 is a rear view of both the driver's and assistant driver's seats with some parts removed;

FIG. 4 is a perspective view of the assistant driver's seat with some parts removed;

FIG. 5 is a side view of the assistant driver's seat, showing a given angular range "θ" within which the seatback of the seat is permitted pivot;

FIG. 6 is a table showing ON and OFF conditions of various sensing means with respect to angular position of the seatback; and FIG. 7 is a flowchart showing operation steps programmed in a control means employed in the first embodiment, and FIG. 8 to 10 are drawings showing a second embodiment of the present invention, in which:

FIG. 8 is a block diagram of a control system which controls the safety seat arrangement of the second embodiment;

FIG. 9 is a side view of an assistant's drivers seat, showing an outside load transmitting unit which can move forward and rearward by a position shifter; and FIG. 10 is a side view of the position shifter.

FIGS. 12 to 19 are drawings showing a safety seat which is a fourth embodiment of the present invention, in which:

FIG. 12 is a front view of the seat of the fourth embodiment with some parts removed;

FIG. 13 is a side view of the seat with some parts removed;

FIG. 14 is a front view of framework of a seatback of the seat;

FIG. 15 is a side view of the framework of the seatback;

FIG. 16 is a perspective view of the seatback;

FIG. 17 is a partially sectioned view of a part of an elongate reinforcing structure employed in the seat;

FIG. 18 is a perspective view showing parts of the reinforcing structure; and

FIG. 19 is a schematic view showing a condition wherein an associated motor vehicle is subjected to a side-on vehicle collision;

FIGS. 20 to 24 show a safety seat which is a fifth embodiment of the present invention, in which:

FIG. 20 is a front view of the seat of the fifth embodiment with some parts removed;

FIG. 21 is a side view of the seat with some parts removed;

FIG. 22 is an enlarged side view of a seat cushion frame of the safety seat of the firth embodiment;

FIG. 23 is an enlarged but partial plan view of the seat cushion frame of the safety seat of the fifth embodiment; and FIG. 24 is a perspective view of the seat cushion of the safety:seat of the fifth embodiment; and FIGS. 25 and 26 show a safety seat which is a sixth embodiment of the present invention, in which:

FIG. 25 is a front view of the safety seat with some parts removed; and

FIG. 26 a side view of the safety seat with some parts removed; and

FIGS. 27 and 28 show a safety seat which is a seventh embodiment of the present invention, in which:

FIG. 27 is a front view of the safety seat with some parts removed; and

FIG. 28 is a side view of the safety seat with some parts removed; and

FIGS. 29 to 32 shows a safety seat which is a eighth embodiment of the present invention, in which:

FIG. 29 is a front view of the safety seat with some parts removed;

FIG. 30 is a side view of the safety seat with some parts removed;

FIG. 31 is an enlarged front view of a seatback frame of the safety seat of the eighth embodiment; and FIG. 32 is an enlarged side view of the seatback frame; and FIGS. 33 and 34 show a safety seat which is a ninth embodiment of the present invention, in which:

FIG. 33 is a front view of the safety seat with some parts removed; and

FIG. 34 is a side view of the safety seat with some parts removed; and

FIGS. 35 to 38 show a safety seat which is a tenth embodiment of the present invention, in which:

FIG. 35 is a front view of the safety seat with some parts removed;

FIG. 36 is a side view of the safety seat with some parts removed;

FIG. 37 is an enlarged front view of a seat cushion frame of the seat cushion of the tenth embodiment;

FIG. 38 is an enlarged side view of the seat cushion frame of the tenth embodiment.

DETAILED DESCRIPTION OF THE INVENTION

Referring to FIGS. 1 to 7, there is shown a safety seat arrangement of a first embodiment of the present invention.

Figure 1:
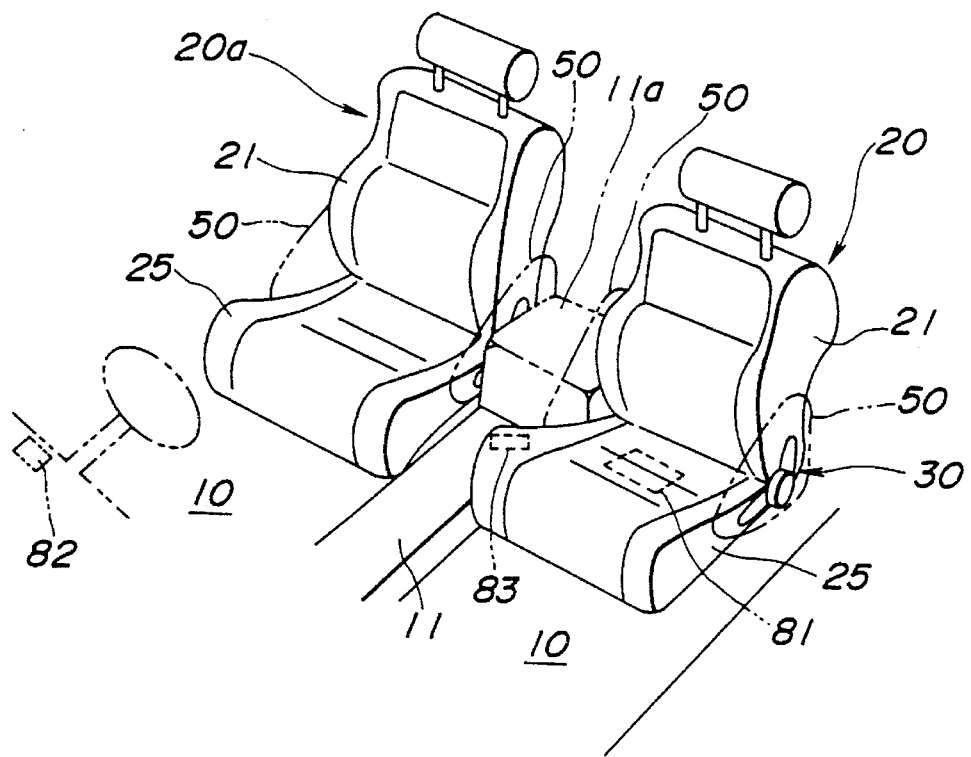
Figure 3:
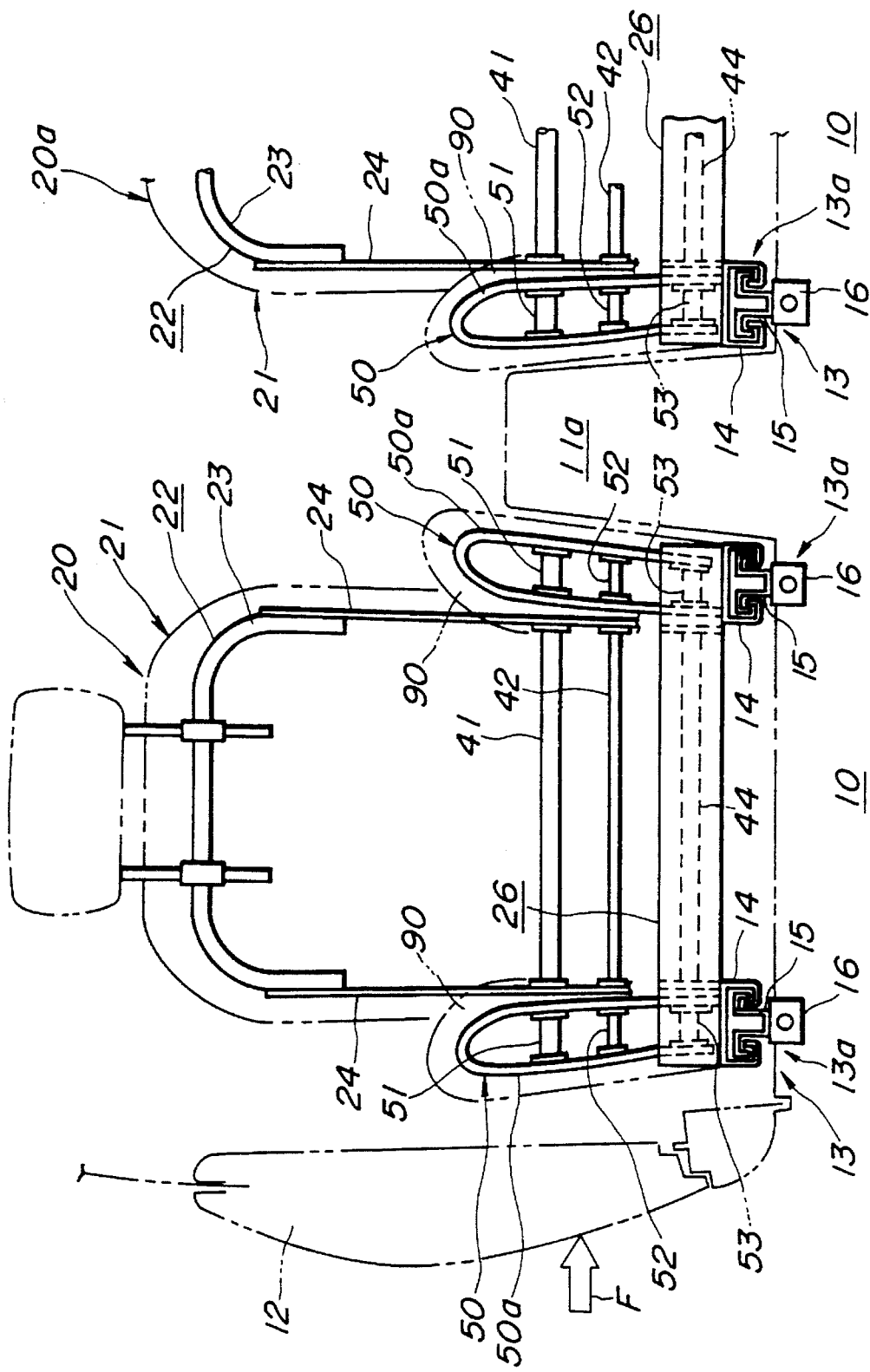

As will be seen from FIGS. 1 and 3, the safety seat arrangement of the first embodiment generally comprises a driver's seat 20a which includes a seat cushion 25 and a seatback 21, an assistant driver's seat 20 (which will be referred to as assistant's seat) which is arranged beside the driver's seat 20a and includes a seat cushion 25 and a seatback 21, a load transmitting center structure 11a which is arranged between the driver's and assistant's seats 20a and 20, an occupant detecting means 81 which is installed in the assistant's seat 20, an engine operation detecting means 82 and a control unit 70. The driver's seat 20a and the assistant's seat 20 are equipped with seatback reclining devices respectively, the reclining device for the assistant's seat being designated by numeral 30. As will be seen from FIG. 3, the seats 20 and 20a are each equipped with a plurality of reinforcing beams 41, 42, 43 and 44, each extending laterally within the seatback 21 or the seat cushion 25.

The two seats 20 and 20a are mounted through respective seat slide devices 13 (see FIG. 3) on a vehicle floor 10. Designated by numeral 11 is a console which is arranged between the two seats 20 and 20a. The load transmitting center structure 11a is positioned behind the console 11. As will become apparent as the description proceeds, upon a side-on vehicle collision, one seat 20 or 20a is forced to abut against the load transmitting center structure 11a causing the latter to be tightly sandwiched between the two seats 20 and 20a. Thus, upon this, the impact force applied to the seat 20 or 20a is transmitted to the other seat 20a or 20 through the load transmitting center structure 11a.

The load transmitting center structure 11a is constructed of a shock absorbing material, such as a foamed aluminium, a rigid urethane foam, a honeycomb structure member or the like.

As will be understood from FIGS. 1 and 3, the load transmitting center structure 11a is so arranged and sized that each lateral side thereof can face an inside lower end portion of the corresponding seatback 21 even when, due to the work of the seat slide device 13, the seat takes its frontmost or rearmost position.

The seat slide device 13 comprises two rail units 13a and 13a which are arranged to support thereon lateral lower sides of the seat cushion 25 of each seat. Each rail unit 13a comprises a stationary rail 15 which is fixed through leg members 16 to the vehicle floor 10, and a movable rail 14 which is slidably engaged with the stationary rail 15 and supports thereon the seat cushion 25.

Figure 4:
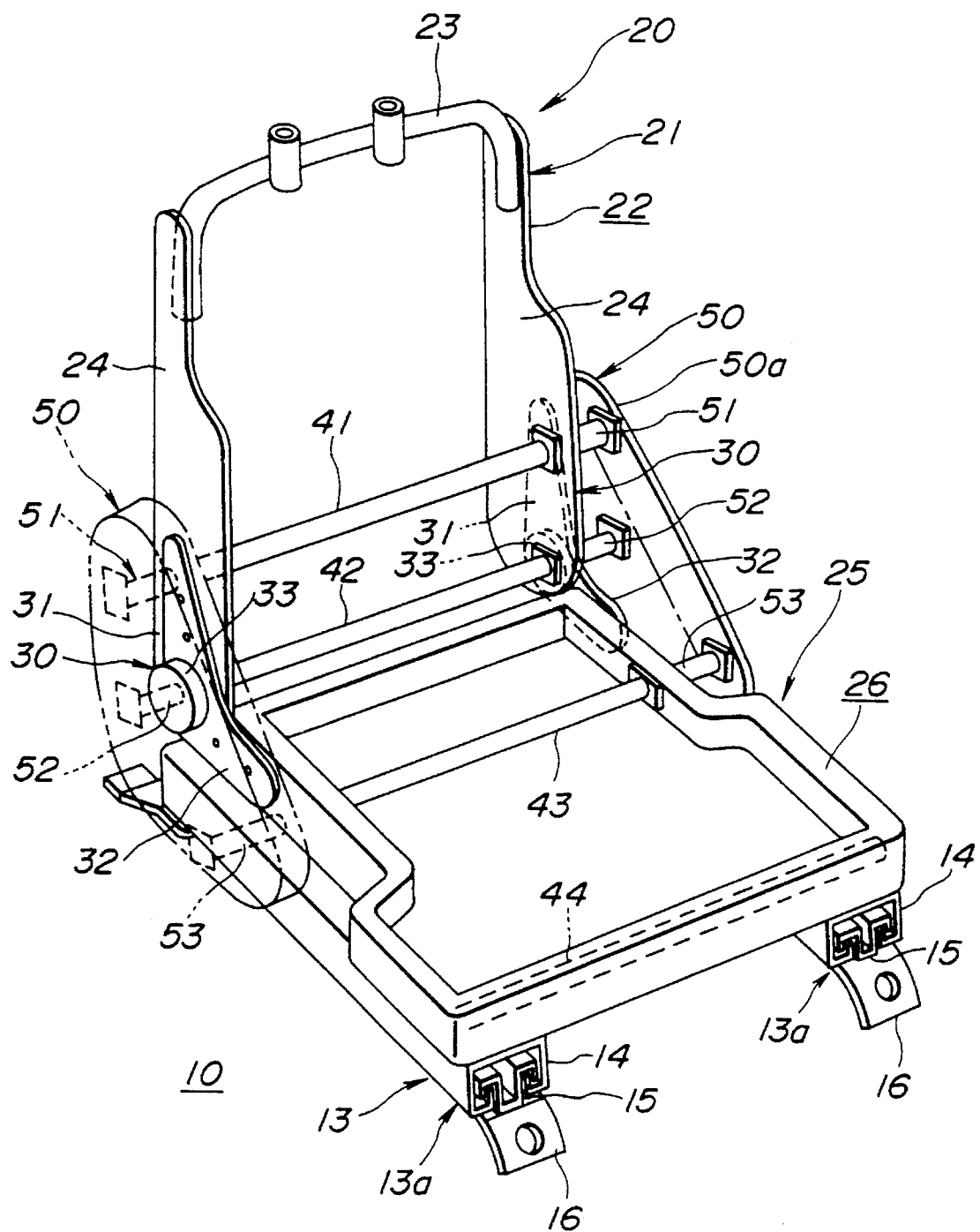
Figure 5:
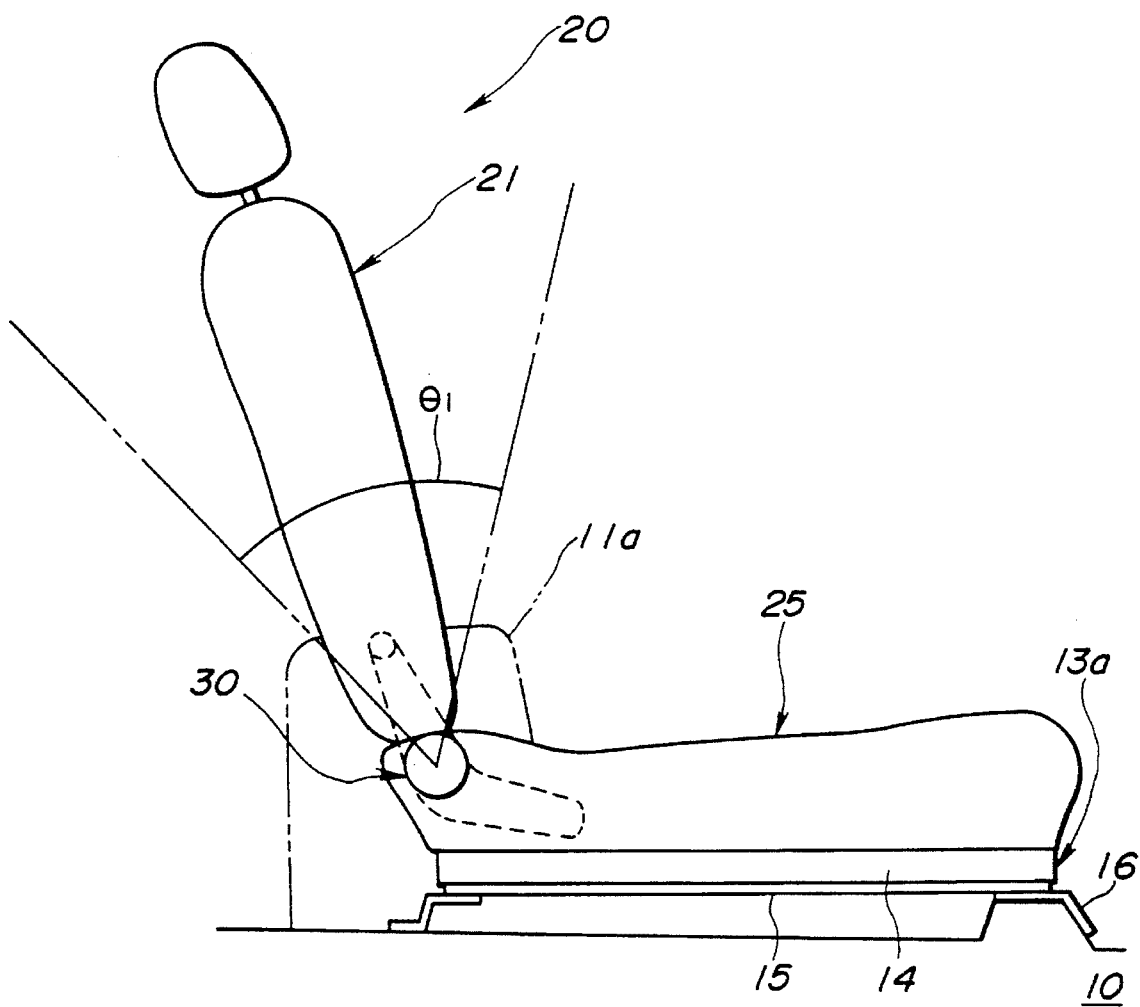

As will be seen from FIGS. 3 and 4 which show the assistant's seat 20, the seatback 21 is pivotally connected to a rear end of the seat cushion 25 through the reclining device 30. With this reclining device 30, the inclination angle of the seatback 21 relative to the seat cushion 25 is adjustable. The seat cushion 25 comprises a generally rectangular seat cushion frame 26 mounted on the rail units 13a and 13a, and the seatback 21 comprises a generally U-shaped seatback frame 22.

As is seen from FIG. 4, the seatback frame 22 comprises two flat side members 24 and 24 and a generally U-shaped upper member 23 which extends between upper ends of the flat side members 24 and 24. First and second parallel reinforcing beams 41 and 42 extend between lower portions of the flat side members 24 and 24. Similar to this, third and fourth reinforcing beams 43 and 44 extend between opposed side portions of the seat cushion frame 26. That is, the third reinforcing beam 43 is positioned at a relatively rear part of the frame 26, while, the fourth reinforcing beam 44 is positioned at a front end of the frame 26, as shown.

It is to be noted that driver's seat 20a has substantially the same construction as the above-mentioned assistant's seat.

As is seen from FIG. 4, the reclining device 30 comprises two base members 32 which are secured to opposed rear ends of the seat cushion frame 26. The base members 32 have rear ends to which respective arm members 31 are pivotally connected through pivot shafts 33. The arm members 31 are secured to the flat side members 24 of the seat back 21. Thus, the seatback 21 can pivot about the pivot shafts 33 relative to the seat cushion 25. Although not shown in FIGS. 1,3 and 4, an electric motor 33a (see FIG. 2) is employed for powering the reclining device 30, that is, for powering the arm members 31. The electric motor 33a is controlled by the control unit 70.

As is best shown in FIG. 4, generally triangular load transmitting units 50 and 50 are fixed to lateral sides of the seat cushion 25. As will become apparent as the description proceeds, upon a side-on vehicle collision, these units 50 function to effectively transmit the abnormally big force, which has been just applied to the seat 20, to the load transmitting center structure 11a.

As is seen from FIG. 3, each load transmitting unit 50 comprises a structural base member 50a which has a generally U-shaped cross section, and three cross bars 51, 52 and 53 which are perpendicularly and tightly held by the structural base member 50a. As is seen from FIG. 4, the three cross bars 51, 52 and 53 are arranged coaxial with the first, second and third reinforcing beams 41, 42 and 43 respectively. Each load transmitting unit 50 is equipped with a cushion member 90 at a side facing the seat 20.

Figure 2:
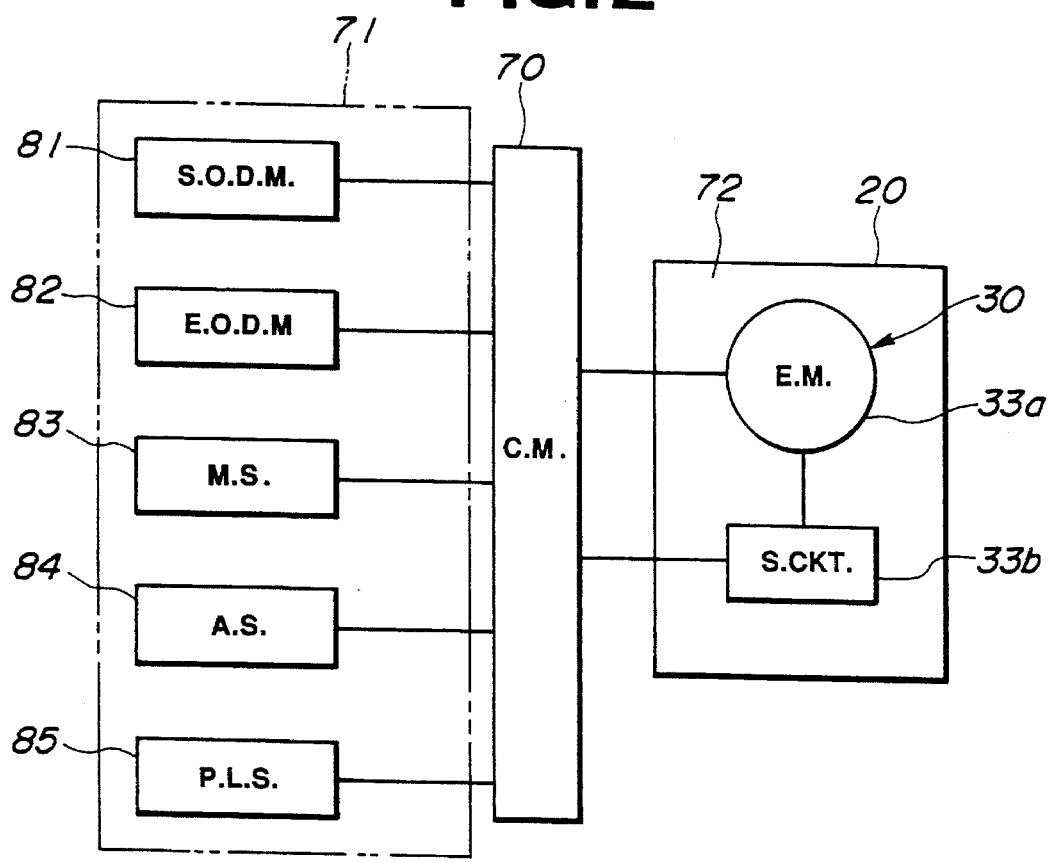

Referring to FIG. 2, there is shown a control system for the safety seat arrangement. The control unit 70 for controlling the power reclining device 30 of the assistant's seat 20 is a microcomputer which generally comprises a central processing unit (CPU), a read only memory (ROM) and a random access memory (RAM). The computer has input and output devices 71 and 72 connected thereto. The input device 71 has a seat occupant detecting means 81, an engine operation detecting means 82, a manual switch 83, an automatic switch 84 and a position limiting switch 85 connected thereto.

The seat occupant detecting means 81 is a pressure sensor, which is installed in the seat cushion 25 of the assistant's seat 20, as shown in FIG. 1. That is, upon sensing a pressure due o sitting of a seat occupant on the assistant's seat 20, the pressure sensor 81 is turned "ON". This "ON" is fed to the control unit 70.

The engine operation detecting means 82 is a switch which is turned "ON" when an ignition switch is turned "ON" by an ignition key.

The manual switch 83 is used for manually controlling the reclining device 30 and mounted on an inboard side of the seat cushion 25 of the assistant's seat 20. That is, by manipulating the manual switch 83, the electric motor 33a of the reclining device 30 is controlled to force the seatback 21 to pivot to a desired angular position.

The automatic switch 84 is turned "ON" for a short period when the engine operation detecting means 82 is turned "ON". This will be understood from the table of FIG. 6. As will become apparent as the description proceeds, when the automatic switch 84 is turned "ON", the seatback 21 of the assistant's seat 20 is automatically pivoted to an angular position which coincides with that taken by the seatback 21 of the driver's seat 20a. That is, upon "ON" condition of the automatic switch 84, the control unit 70 compares the inclination angle of the seatback 21 of assistant's seat 20 with that of the driver's seat 20a, and if there is any difference between them, the control unit 70 actuates, through the output device 72, the electric motor 33a of the reclining device 30 by a degree corresponding to the difference thereby to move the seatback 21 of the assistant's seat 20 to the coincident angular position. Upon completion of pivoting of the seatback 21 of the assistant's seat 20, the automatic switch 84 is turned "OFF".

As is seen from FIG. 2, the rotation of the electric motor 33a is monitored by a sensor circuit 33b which comprises a reed switch. The sensor circuit 33b feeds the control unit 70 with a pulse signal which represents the number of rotations of the electric motor 33a. By processing the pulse signal from the sensor circuit 33b, the control unit 70 derives the desired angular position of the seatback 21 of the assistant's seat 20.

As is seen from the table of FIG. 6, the position limiting switch 85 is turned "ON" when both the engine operation detecting means 82 and the seat occupant detecting means 81 assume their "ON" positions. That is, upon receiving "ON" signal from the position limiting switch 85, the control unit 70 determines a given angular range "θ" (see FIG. 5) within which the seatback 21 of the assistant's seat 20 is permitted to pivot when the manual switch 83 is manipulated.

It is to be noted that when the seatback 21 of the assistant's seat 20 is within the given angular range "θ", the inward end of the first reinforcing beam 41 is directed to the load transmitting center structure 11a. Thus, when, with the seatback 21 of the assistant's seat 20 kept within such range "θ", the impact force applied to the seat 20 is assuredly transmitted to the center structure 11a through the first reinforcing beam 41.

That is, when the position limiting switch 85 is turned "ON", the control unit 70 limits the angular position of the seatback 21 of the assistant's seat 20 within the given range "θ".

In the following, operation of the first embodiment will be described with reference to the drawings, particularly FIGS. 2, 3 and 7.

When, for starting the engine, the ignition switch is turned "ON" by the ignition key, the engine operation detecting means 82 is turned "ON" and at the same time the input device 71 of the control unit 70 is energized. That is, upon this, "ON" signal is fed to the control unit 70 from the engine operation detecting means 82.

Figure 7:
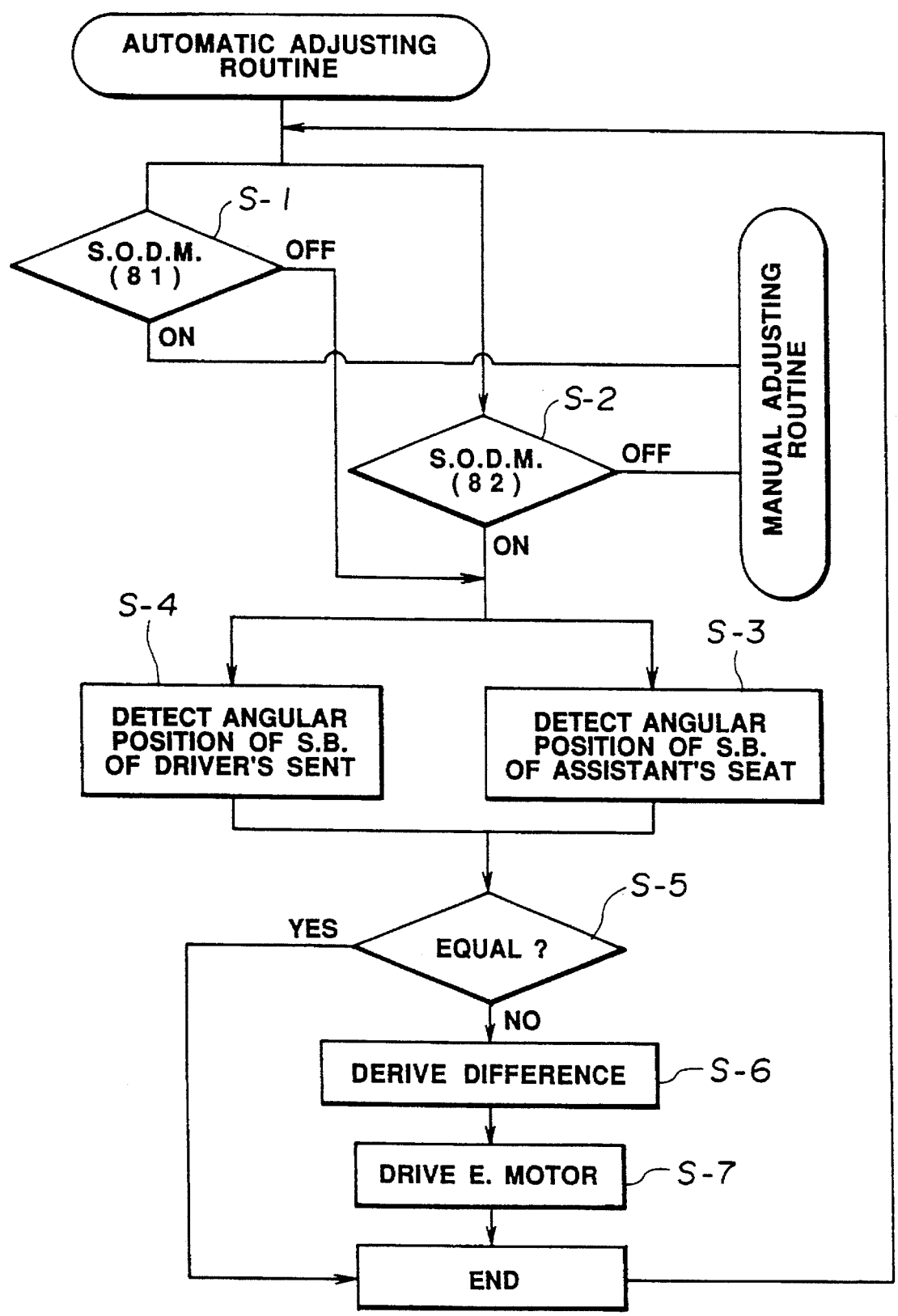

If, under this condition, the assistant's seat 20 has no occupant thereon, the seat occupant detecting means 81 is kept "OFF" (viz., step-1 in FIG. 7). That is, "OFF" signal is fed to the control unit 70 from the occupant detecting means 81.

As is seen from the table of FIG. 6 and the flowchart of FIG. 7, when the seat occupant detecting means 81 assumes "OFF" condition (step-1) and the engine operation detecting means 82 assumes "ON" condition (step-2), the control unit 70 actuates the power reclining device 30 to pivot the seatback 21 of the assistant's seat 20 to an angular position which is coincident with that of the seatback 21 of the driver's seat 20a. More specifically, when the engine operation detecting means 82 is turned "ON" (step-2), the automatic switch 84 is turned "ON" for a short period. Upon this, the control unit 70 measures the inclination angles (step-3 and step-4) of the seatbacks 21 of the two seats 20 and 20a and compares them (step-5), and if any difference is present therebetween, the control unit 70 actuates the electric motor 33a of the reclining device 30 to pivot the seatback 21 of the assistant's seat to the coincident position (step-7).

when, with the seatback 21 of the assistant's seat 20 thus kept coincident with he seatback 21 of the driver's seat 20a, the vehicle encounters a side-on vehicle collision applying an abnormally big force to the door 12 (see FIG. 3) in the direction of the arrow F, the door 12 is inwardly deformed and thus the big force is applied through the outside triangular load transmitting unit 50 to the assistant's seat 20. The big force applied to the assistant's seat 20 is then applied through the inside triangular load transmitting unit 50 to the load transmitting center structure 11a and then through the inside triangular load transmitting unit 50 to the driver's seat 20a.

Because almost all of the impact big force applied to the side door 12 is received by the assistant's seat 20, the center structure 11a and the driver's seat 20a, which constitute a united structure, the impact shock applied to the vehicle is effectively dampened.

It is to be noted that, due to the coincident positioning of the seatbacks 21 of the two seats 20 and 20a, the load transmission from the seatback 21 of one seat 20 to the seatback 21 of the other seat 20a through the center structure 11a is effectively carried out.

Furthermore, because of provision of the various reinforcing beams 41, 42, 43 and 44 which are installed, the seats 20 and 20a are prevented from being deformed or damaged.

These advantageous phenomena induce safety of the driver on the driver's seat 20a.

When, under operation of the engine, a passenger sits on the assistant's seat 20, the seat occupant detecting means 81 is turned "ON". Upon this, the position limiting switch 85 is turned "ON", as is understood from the table of FIG. 6. Thus, as has been described hereinabove, the control unit 70 limits the angular position of the seatback 21 of the assistant's seat 20 to the given angular range "θ1" (see FIG. 5).

Thus, under this condition, the angular position of the seatback 21 of the assistant's seat 20 can not exceed the given angular range "θ1" even when the manual switch 83 for the power reclining device 30 is manipulated by the seat occupant. As has been described hereinbefore, when the seatback 21 of the assistant's seat 20 is within the range "θ", the impact force applied to the seat 20, which is produced upon a side-on vehicle collision, is assuredly transmitted to the load transmitting center structure 11a through the first reinforcing beam 41. Thus, safety of the seat occupants on the two seats 20 and 20a is assured.

Figure 8:
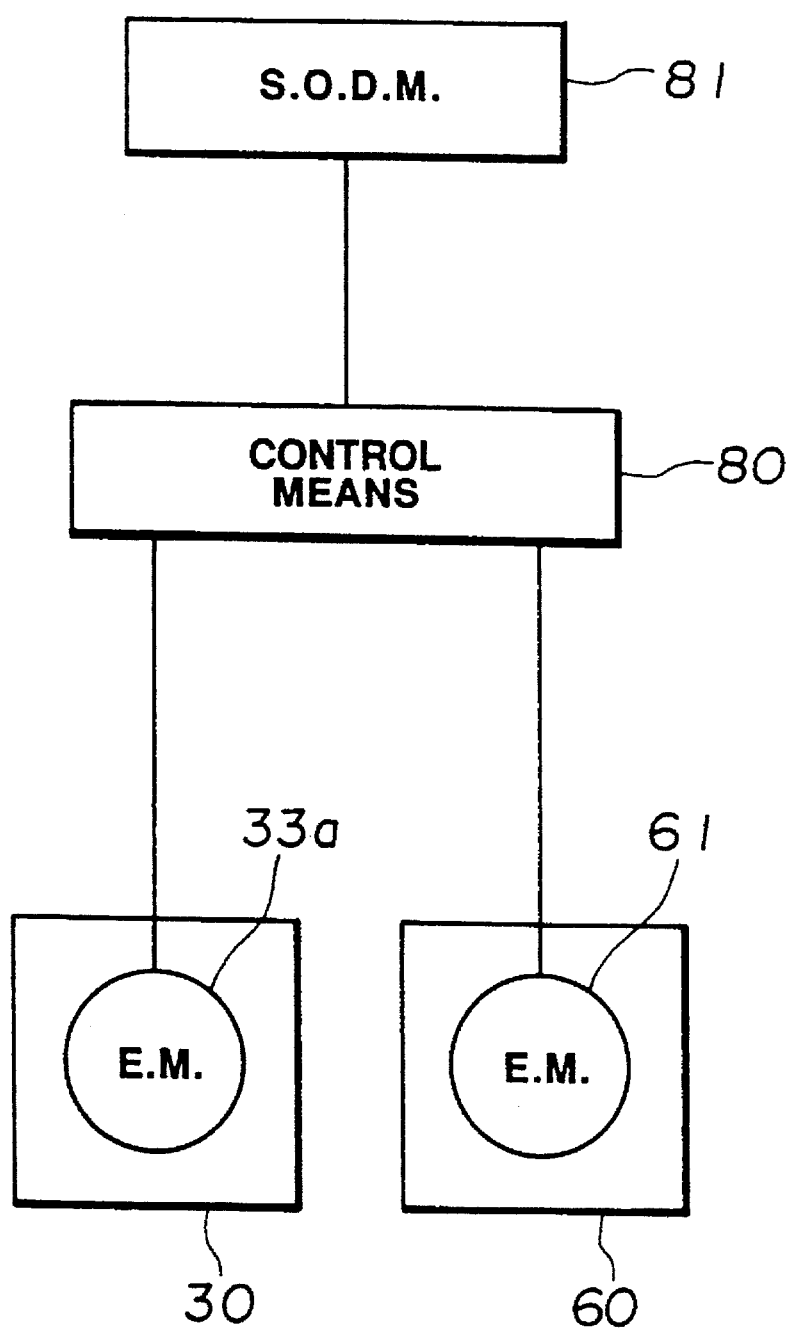
Figure 9:
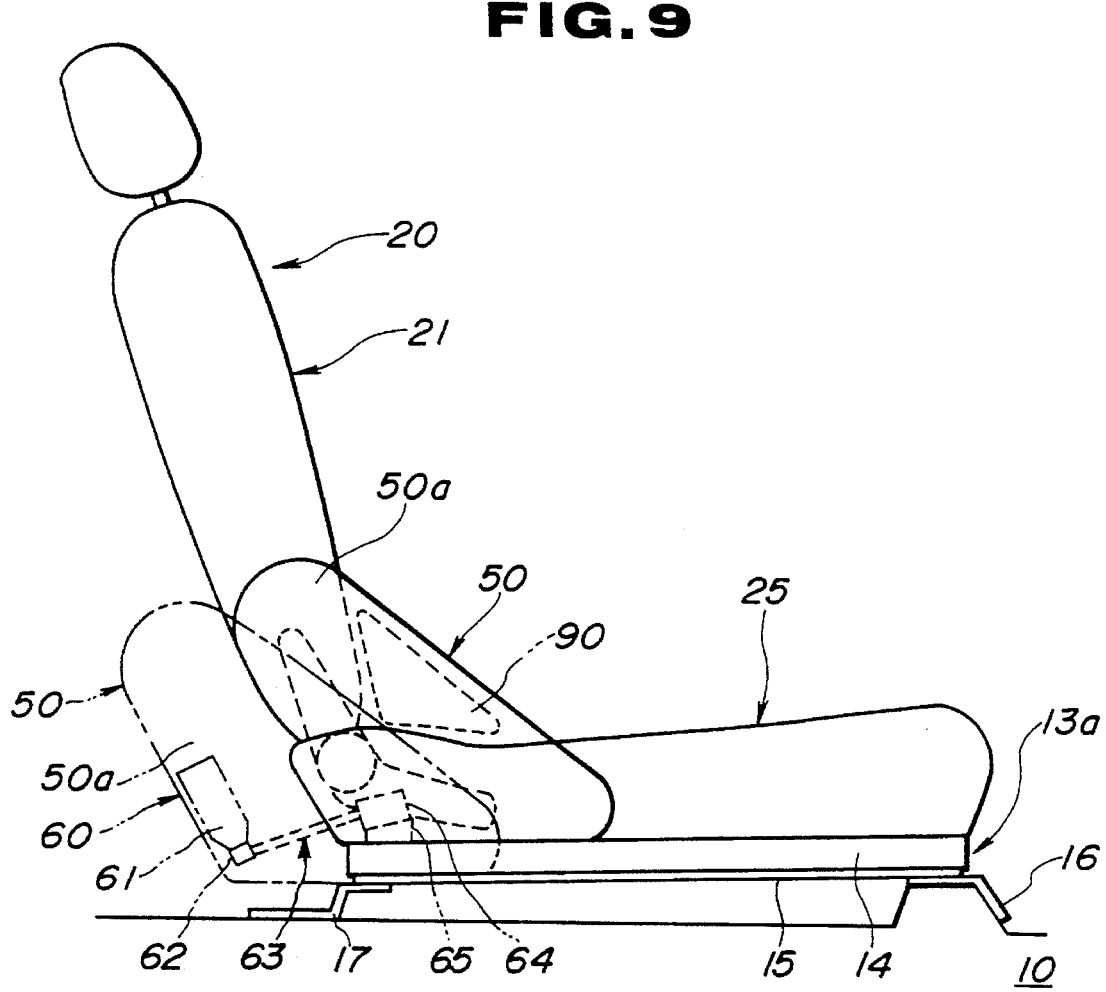
Figure 10:
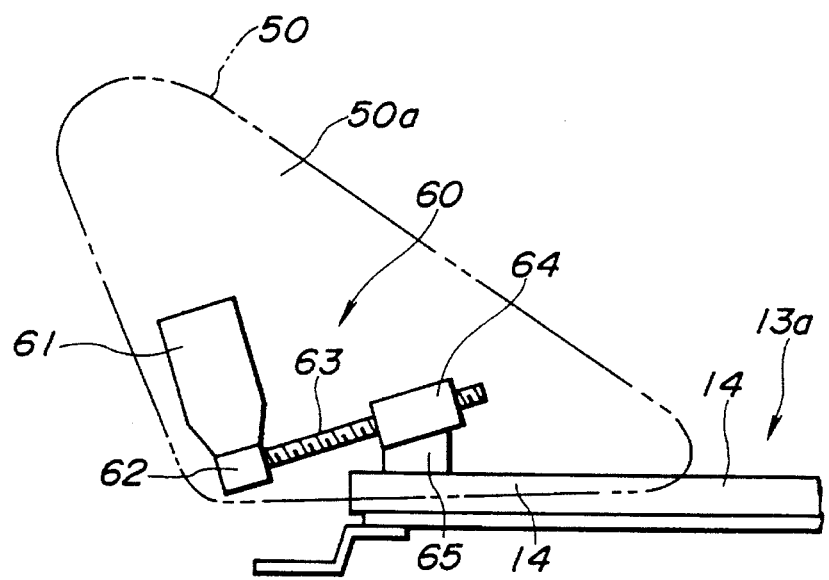

Referring to FIGS. 8 to 10, there is shown a safety seat arrangement of a second embodiment of the present invention.

Since the second embodiment is similar to the above-mentioned first embodiment, only parts and constructions which are different from those of the first embodiment will be described in detail in the following.

As is seen from FIG. 9, in the second embodiment, there is employed a position shifter 60 for the outside load transmitting unit 50. That is, due to work of the position shifter 60, only the outside load transmitting unit 50 is moved along the axis of the associated seat cushion 25 between front and rear positions which are shown by solid and phantom lines respectively.

It is to be noted that the front position is the position which assures the effective transmission of the abnormally big force from the load transmitting unit 50 to the first, second and third reinforcing beams 41, 42 and 43 of the seat 20. While, the rear position is the position which facilitates ingress and egress of a passenger for the seat 20.

As is understood from FIG. 10, the position shifter 60 comprises a nut member 64 which is connected through a bracket 65 to the outside movable rail 14 of the seat 20. A threaded bolt 63 passes through the nut member 64 while being meshed therewith. The threaded bolt 63 is powered or rotated by an electric motor 61 which is secured to the structural base member 50a of the outside load transmitting unit 50. For reducing the speed of rotation applied to the threaded bolt 63, a speed reduction gear unit 62 is interposed between the electric motor 61 and the threaded bolt 63.

As is seen from FIG. 3, the structural base member 50a is equipped at a side facing the seat 20 or 20a with a cushion member 90.

Referring to FIG. 8, there is shown a control system for controlling the safety seat arrangement of the second embodiment.

The control system comprises the seat occupant detecting means 81 which can detect whether the seat 20 carries thereon a seat occupant or not. Thus, the above-mentioned pressure sensor is used as the means 81. If desired, a seatbelt switch, which is turned "ON" when a seat occupant wears a seatbelt, may be used as the means 81, which is disclosed in Japanese Utility Model Second Provisional Publication 62-117131. The information signal produced by the seat occupant detecting means 81 is fed to a control unit 80 which is a microcomputer. As shown, instruction signals produced by the control unit 80 are fed to both the electric motor 33a of the reclining device 30 and the electric motor 61 of the position shifter 60.

In the following, operation of the second embodiment will be described with reference to he drawings, particularly FIGS. 8 and 9.

When there is no occupant on the seat 20, the seat occupant detecting means 81 is kept "OFF". Under this condition, the outside load transmitting unit 50 assumes the rear position as shown by phantom line in FIG. 9. Thus, a passenger can easily sit on the seat 20.

When then the passenger actually sits on the seat 20, the seat occupant detecting means 81 issues "ON" signal to the control unit 80. Upon this, the control unit 80 energizes the electric motor 61 of the position shifter 60 and bus moves the outside load transmitting unit 50 from the rear position to the front position which is shown by solid line in FIG. 9. At the same time, the control unit 80 limits the angular position of the seatback 21 of the seat 20 within the afore-mentioned given range "θ". Thus, if the seatback 21 has been left beyond the given range "θ", the seatback 21 is automatically pivoted to a position within the range. Of course, thereafter, the angular position of the seatback 21 can be adjusted by manipulating a manual switch 83, but within the range "θ".

When the seat occupant leaves the seat 20, the seat occupant detecting means 81 is turned "OFF". Thus, the control unit 80 energizes the motor 61 of the position shifter 60 to rotate in the opposite direction thereby moving the load transmitting unit 50 from the front position to he rear position. At the same time, the control unit 80 cancels the limitation of the angular position taken by the seatback 21 of the seat 20.

Figure 11:
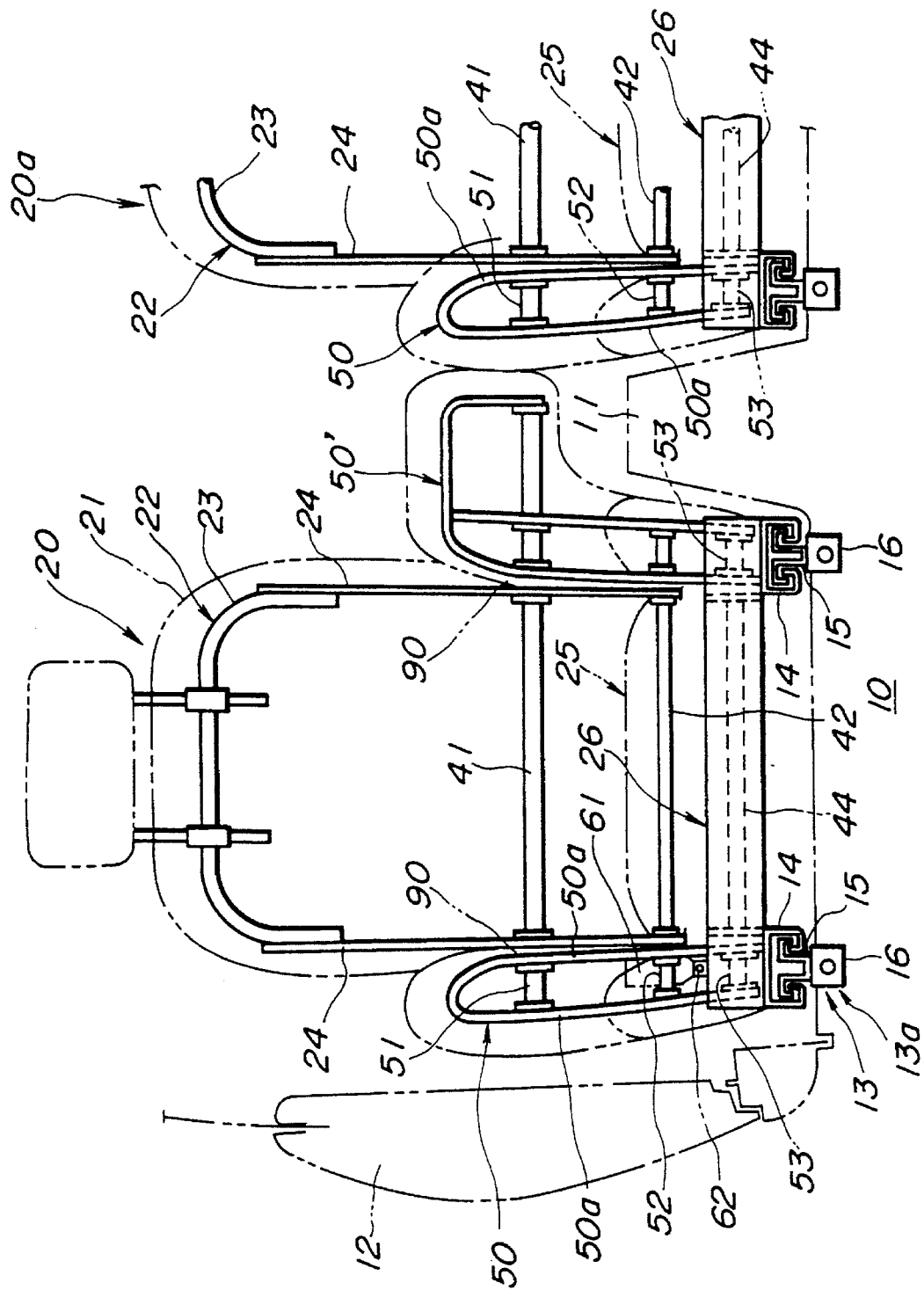
FIG. 11 is a view similar to FIG. 3, but showing a safety seat arrangement of a third embodiment of the present invention.

Referring to FIG. 11, there is shown a safety seat arrangement of a third embodiment of the present invention.

The safety seat arrangement of this embodiment is substantially the same as that of the second embodiment except the inside load transmitting unit which is denoted by numeral 50'. As shown, the unit 50' has a laterally extending part which abuts against the inside load transmitting unit 50 of the other seat 20a. Thus, in this embodiment, there is no need of providing a structure which corresponds to the load transmitting center structure 11a which is employed in the first and second embodiments.

Referring to FIGS. 12 to 19, there is shown a safety seat 110a which is a fourth embodiment of the present invention.

Figure 12:
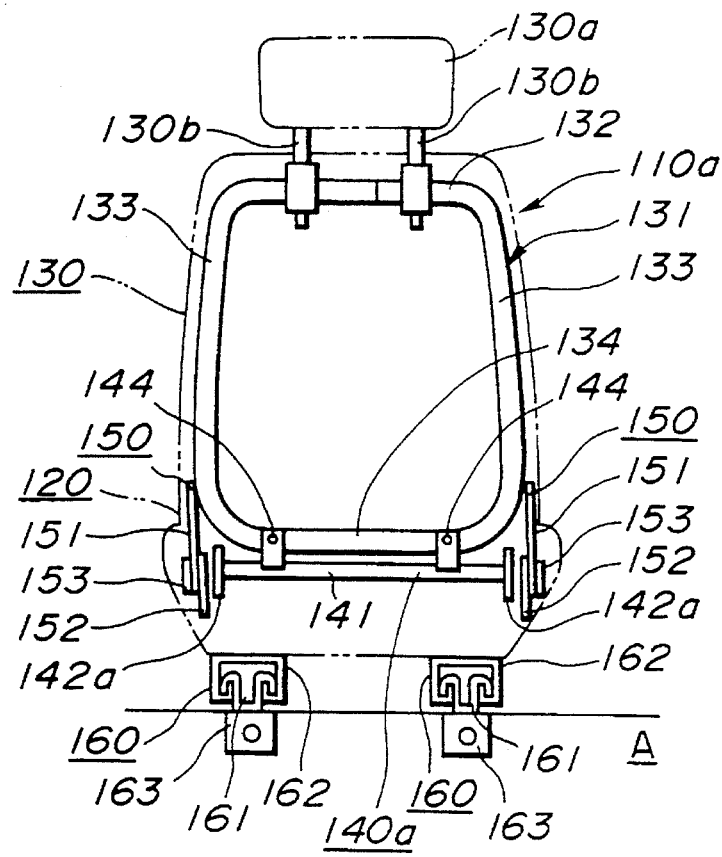
Figure 13:
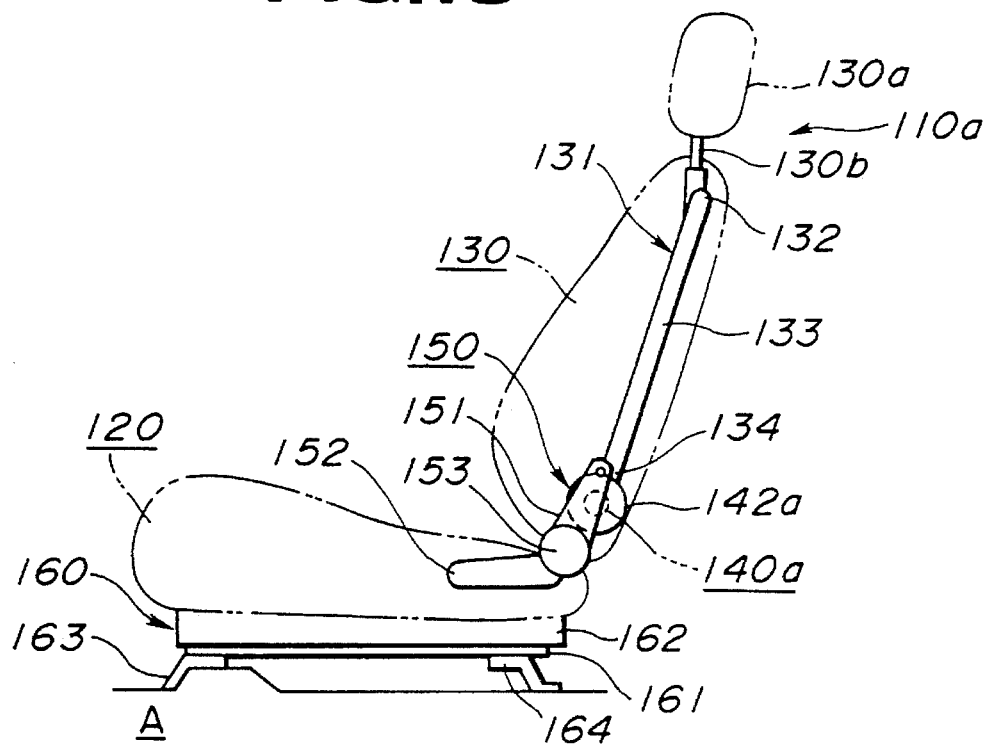

As is best shown in FIGS. 12 and 13, the safety seat 110a comprises generally a seat so cushion 120, a seatback 130 and a reclining device 150 through which the seatback 130 is pivotally connected to a rear end of the seat cushion 120.

The seatback 130 has at its lower base portion a laterally extending reinforcing structure 140a. As will be described in detail hereinafter, when, due to a side-on vehicle collision or the like, an abnormally big force is applied to an outside portion of the seat 110a, the force is effectively transmitted to the inside portion of the seat through the reinforcing structure 140a.

The seat cushion 120 is mounted through a seat slide device 160 to a vehicle floor "A". Thus, the seat 110a is movable in a fore-and-aft direction relative to the floor "A". The seat slide device 160 comprises a pair of rail units each including a stationary rail 161 which is connected through leg members 163 and 164 to the vehicle floor "A" and a movable rail 162 which is slidably engaged with the stationary rail 161 and supports thereon the seat proper 110a. Although not shown in the drawings, the seat slide device 160 is equipped with a position locker, so that the seat 110a can be locked at a desired position.

Figure 14:
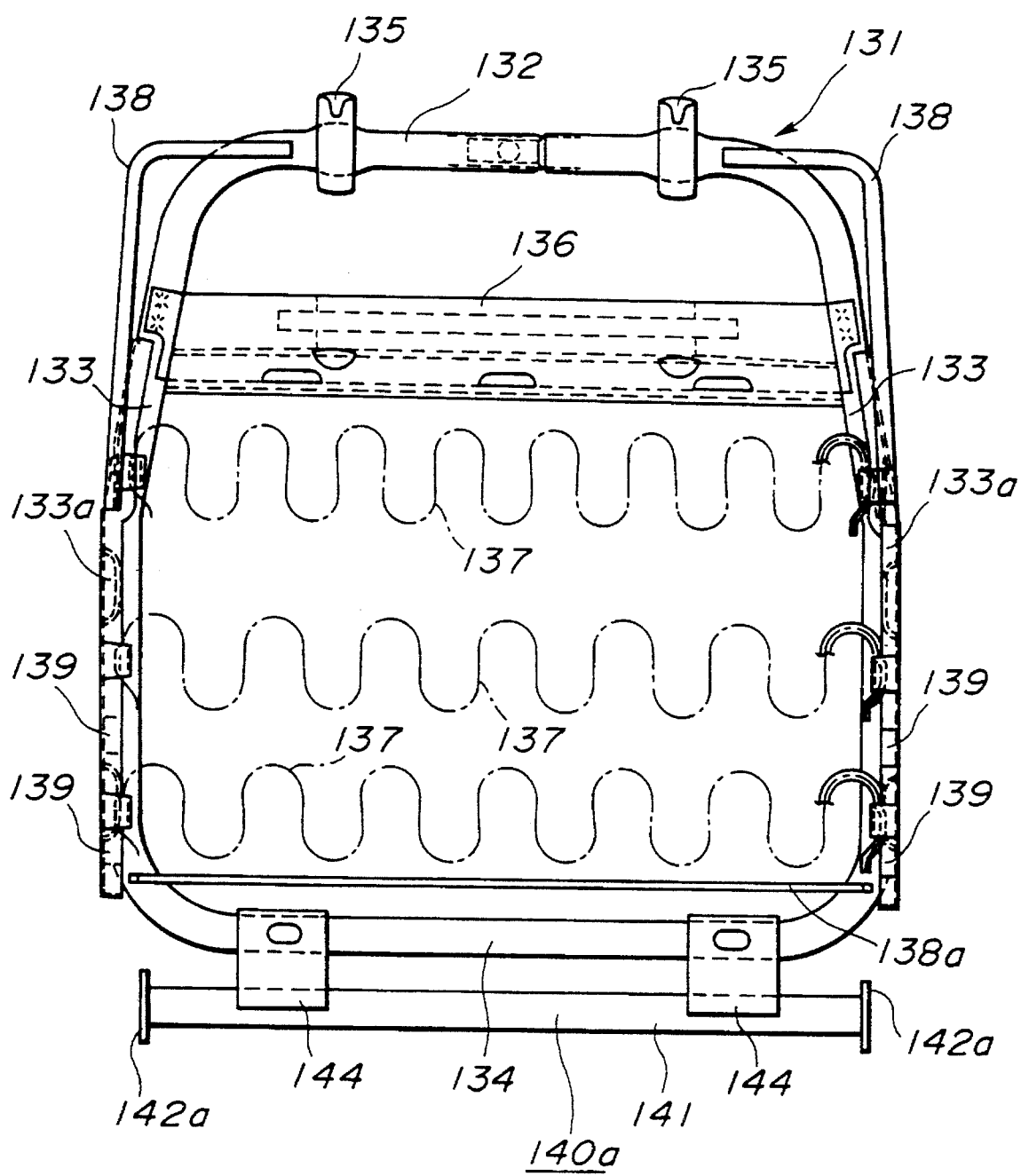
Figure 15:
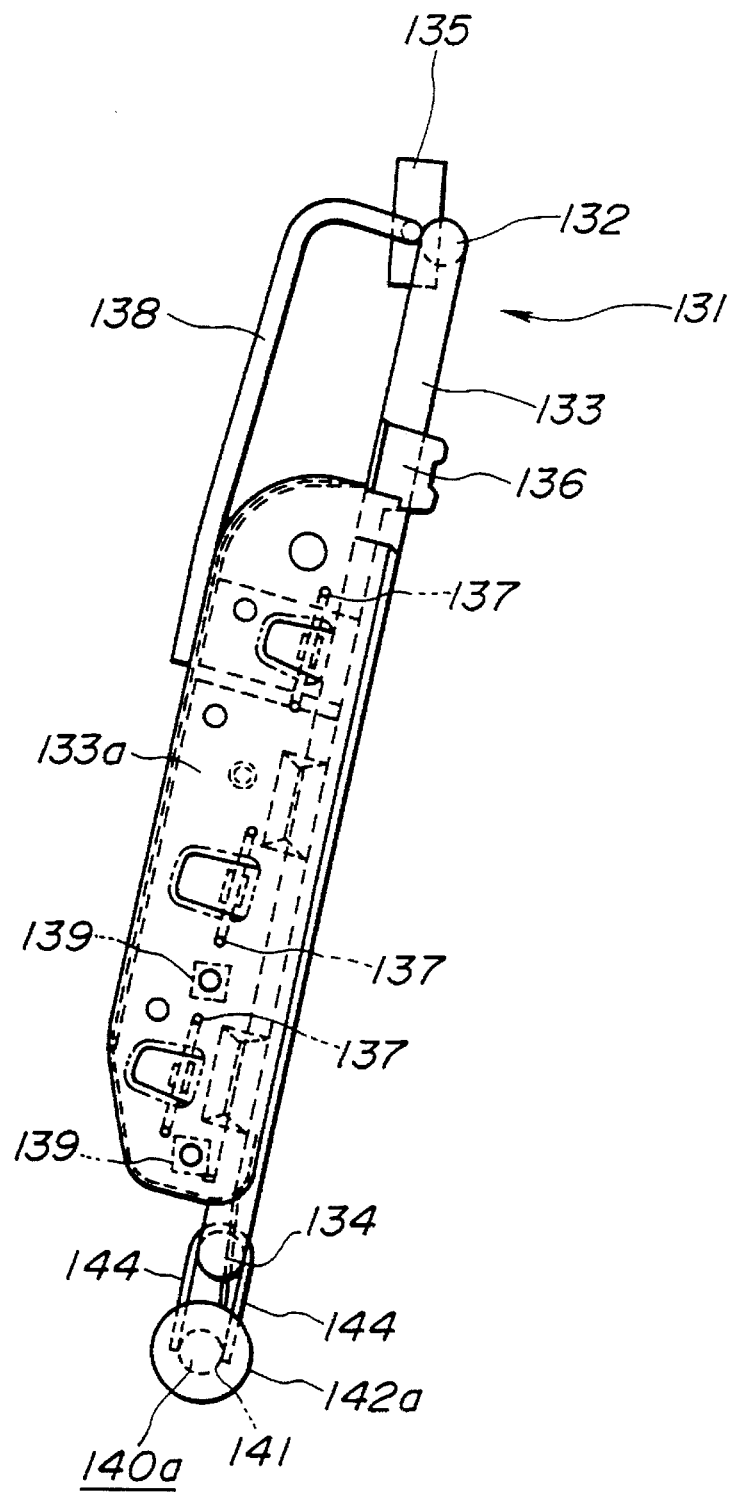
Figure 16:
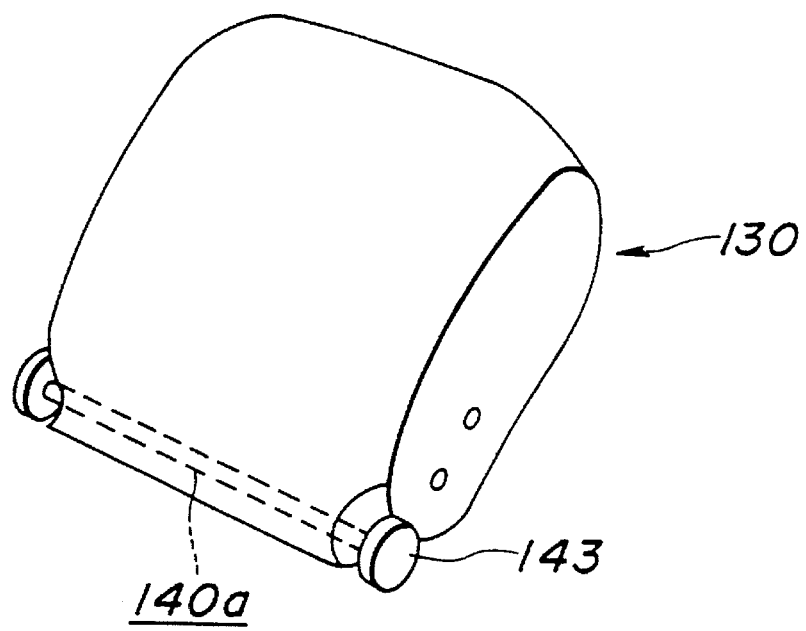

As is best shown in FIGS. 14 and 15, the seatback 130 comprises a rectangular back frame 131 constructed of a pipe member. That is, the back frame 131 comprises two side portions 133, a reversed U-shaped upper portion 132 which extends between upper ends of the side portions 133, and a U-shaped lower portion 134 which extends between lower ends of the side portions 133.

As is best shown in FIG. 14, the elongate reinforcing structure 140a is connected through two brackets 144 to the U-shaped lower portion 134 of the back frame 131. The reinforcing structure 140a extends in parallel with the lower portion 134, as shown.

Figure 17:
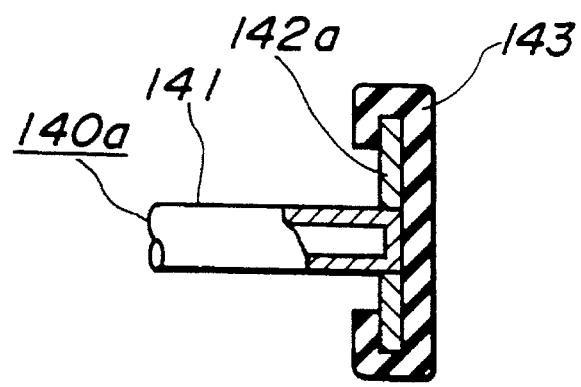
Figure 18:
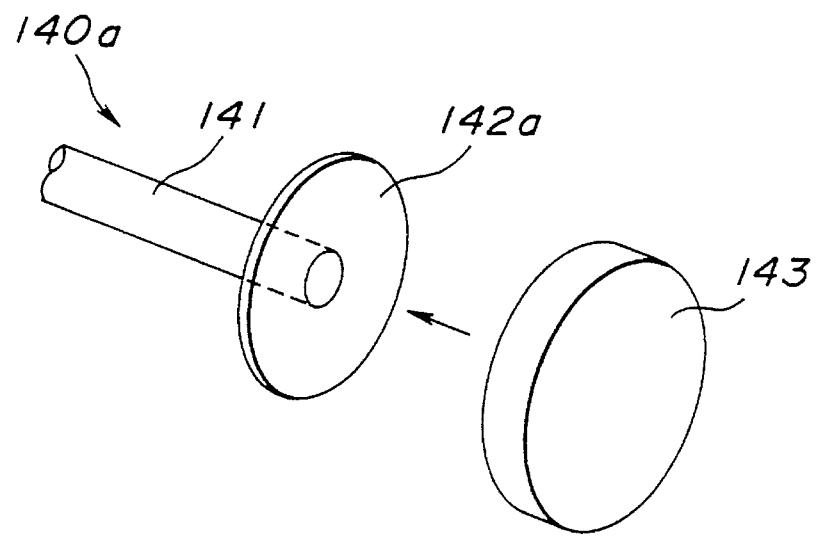

As is seen from FIGS. 14 and 17, the reinforcing structure 140a comprises a high resiliency elongate member 141, circular plates 142a welded to both ends of the elongate member 141 and elastic covers 143 covering the circular plates 142a. As is seen from FIGS. 17 and 18, the elastic cover 143 is press-fitted to the circular plate 142a.

As is seen from FIGS. 14 and 15, between lower ends of the side portions 133 of the back frame 131, there extends a trim cover catching wire 138a. Although not shown in these drawings, a trim cover for the sea,back 130 has a lower end caught by the wire 138a.

As is seen from FIG. 15, to the upper ends of the respective side portions 133 of the back frame 131, there are fixed reinforcing plates 136. Furthermore, as is seen from FIG. 14, to the side portions 133, there are fixed respective side plate members 133a between which a plurality of S-springs 137 extend. To the upper portion 132 of the back frame 131, there are fixed two holders 135 by which stays 130b (see FIG. 12) of a head rest 130a are supported.

As is seen from FIG. 14, to each shoulder portion of the back frame 131, there is mounted a trim cover catching wire 138 by which an upper portion of the trim cover (not shown) is caught.

As is seen from FIGS. 12 and 13, the reclining device 150 comprises generally base members 152 which are secured to laterally opposed sides of a rear end of the seat cushion 120 and arm members 151 which are pivotally connected through respective pivot shafts 153 to the base members 152. The arm members 151 are connected to lower end portions of the side plate members 133a (see FIG. 15) of the back frame 131. For this connection, each side plate member 133a has nuts 139 welded thereto. Although not shown in the drawings, the reclining device 150 is equipped with a position locker, so that the seatback 130 can be locked at a desired angular position relative to the seat cushion 120.

As is seen from FIG. 13, the arm members 151 of the reclining device 150 are positioned on axial extensions of the elongate member 141 of the reinforcing structure 140a. That is, each arm member 151 faces the corresponding circular plate 142a fixed to the end of the elongate member 141.

Figure 19:
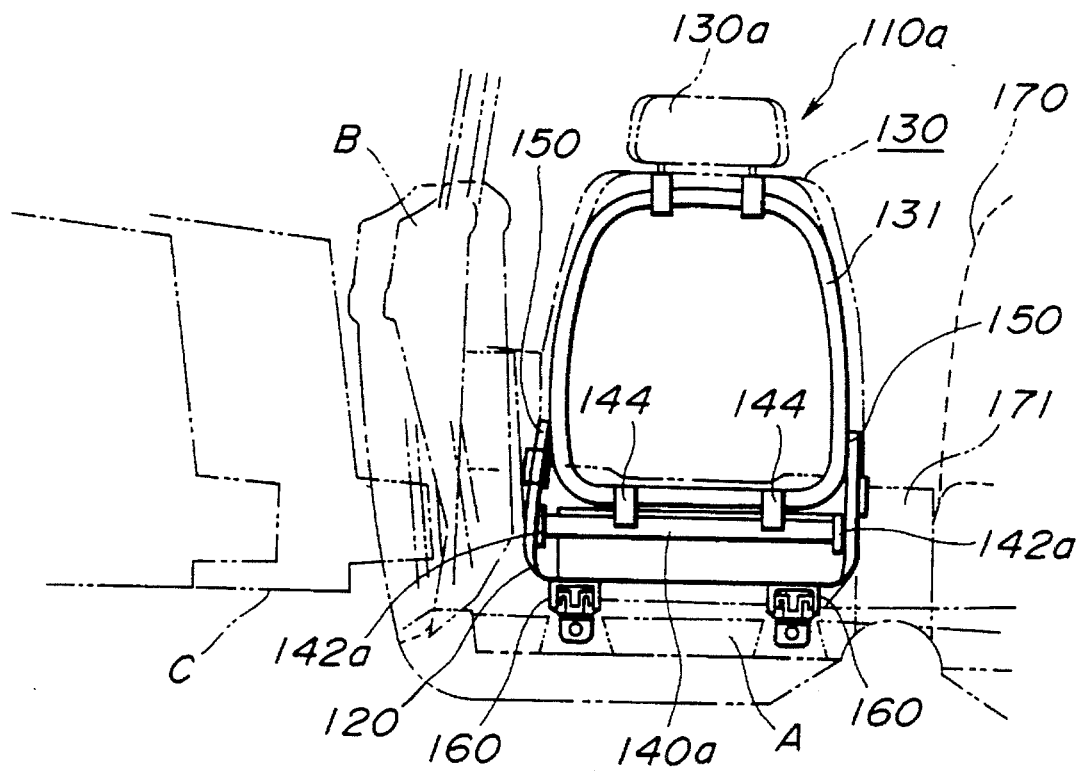
Figure 20:
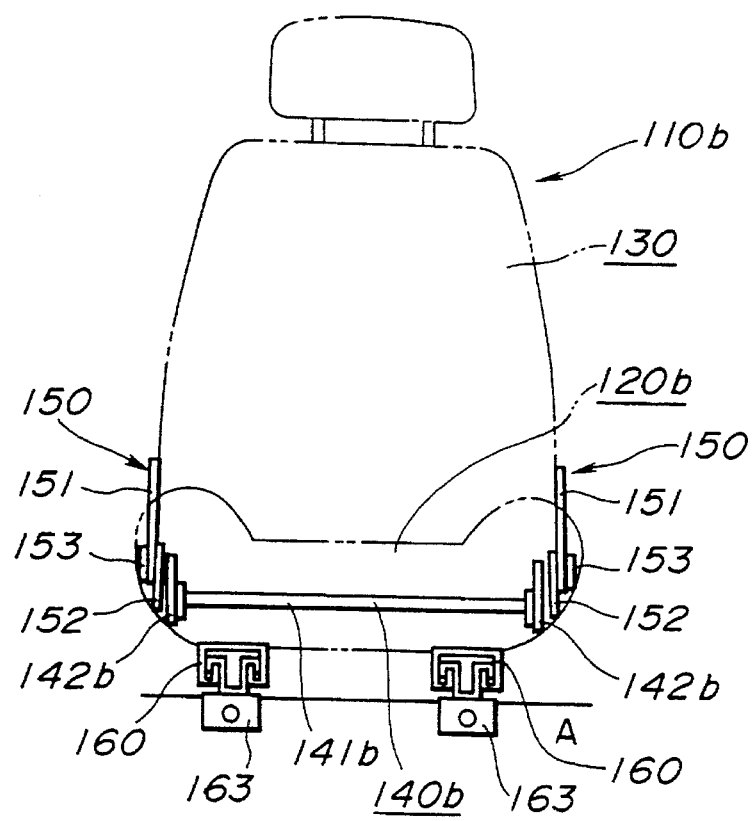

FIG. 19 shows the safety seat 110a which is used as a driver's seat in a motor vehicle. Designated by numeral 170 is an assistant driver's seat which is located beside the seat 110a. A console 171 is arranged between the two seats 110a and 170. Although not shown in this drawing, a load transmitting center structure such as the afore-mentioned center structure 11a (see FIG. 1) is mounted behind the console 171.

As will be understood from FIG. 19, when, due to a side-on vehicle collision with a vehicle "C", an abnormally big force is applied to a door "B", the door "B" is inwardly deformed and pressed against the outside portion of the seat 110a. Upon this, the outside-positioned parts of the reclining device 150 are deformed inward and brought into abutment with the elongate reinforcing structure 140a, and the reinforcing structure 140a is pressed against the lead transmitting center structure.

Because almost all of the abnormally big impact force applied to the side door "B" is received by the outside-positioned parts of the reclining device 150, the reinforcing structure 140a, the inside-positioned parts of the reclining device 150 and the lead transmitting center structure, which constitute a united structure, the impact shock applied to the vehicle is effectively dampened.

It is to be noted that due to provision of the reinforcing structure 140a, durability of the seat 110a against such side-on vehicle collision is remarkably increased.

Referring to FIGS. 20 to 24, there is shown a safety seat 110b which is a fifth embodiment of the present invention.

Since this embodiment is similar to the above-mentioned fourth embodiment, only parts and constructions which are different from those of the fourth embodiment will be described, and the same parts are denoted by the same numerals.

In this fifth embodiment, the seat cushion 120b has at its rear end portion a laterally extending reinforcing structure 140b. The seat cushion 120b comprises a pan frame 121. The pan frame 121 has a rear portion 123 to which the reinforcing structure 140b is directly connected as is seen from FIGS. 22 and 23.

The elongate reinforcing structure 140b comprises a high resiliency elongate member 141b and circular plates 142b welded to both ends of the elongate member 141b. As is seen from FIG. 24, the circular plates 142b are exposed to the outside of the seat cushion 120b.

Figure 21:
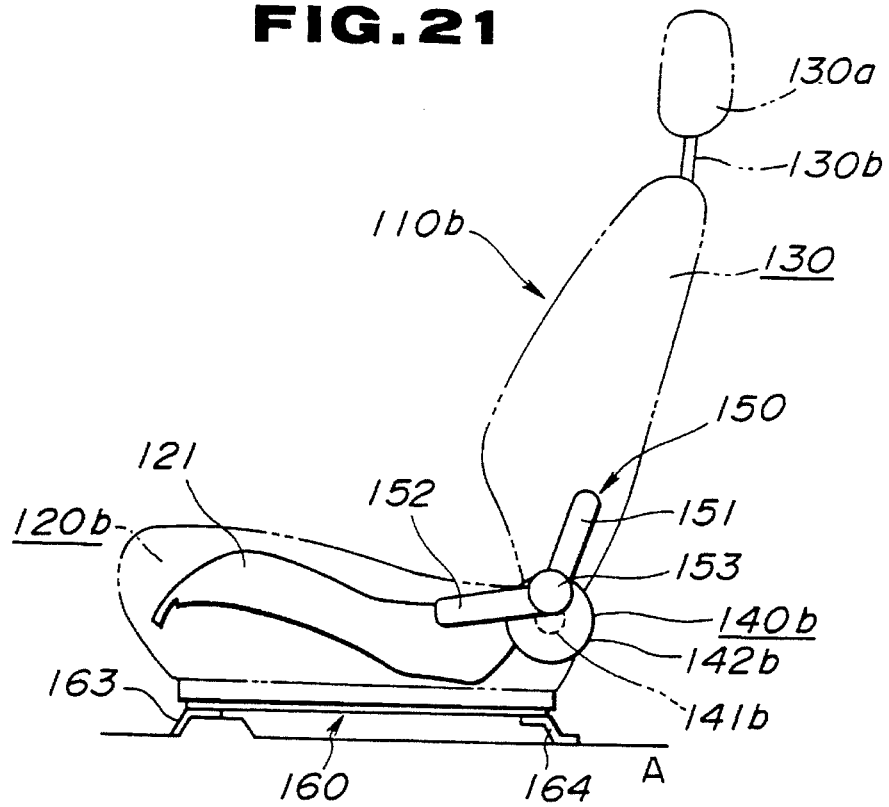
Figure 22:
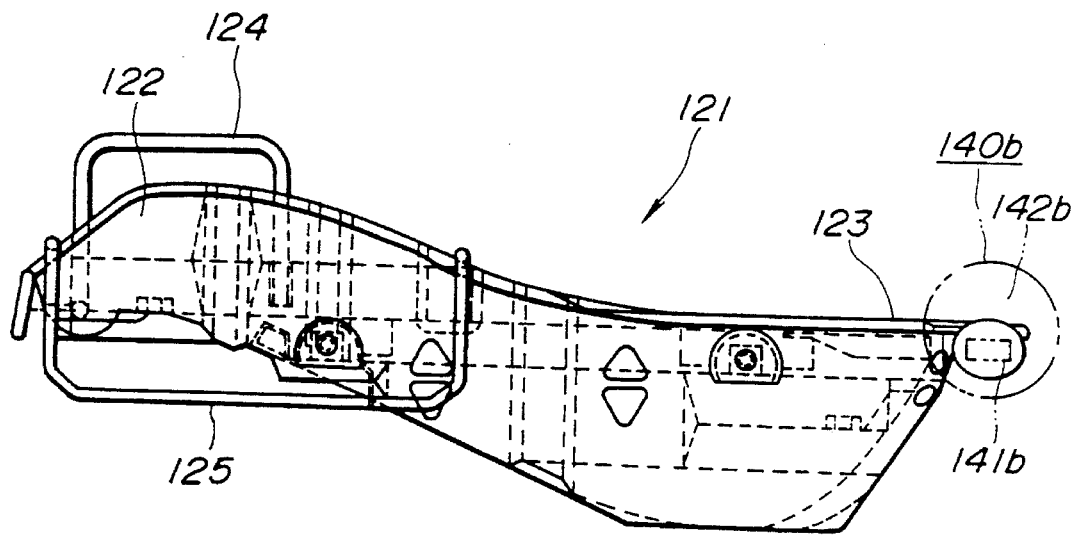
Figure 23:
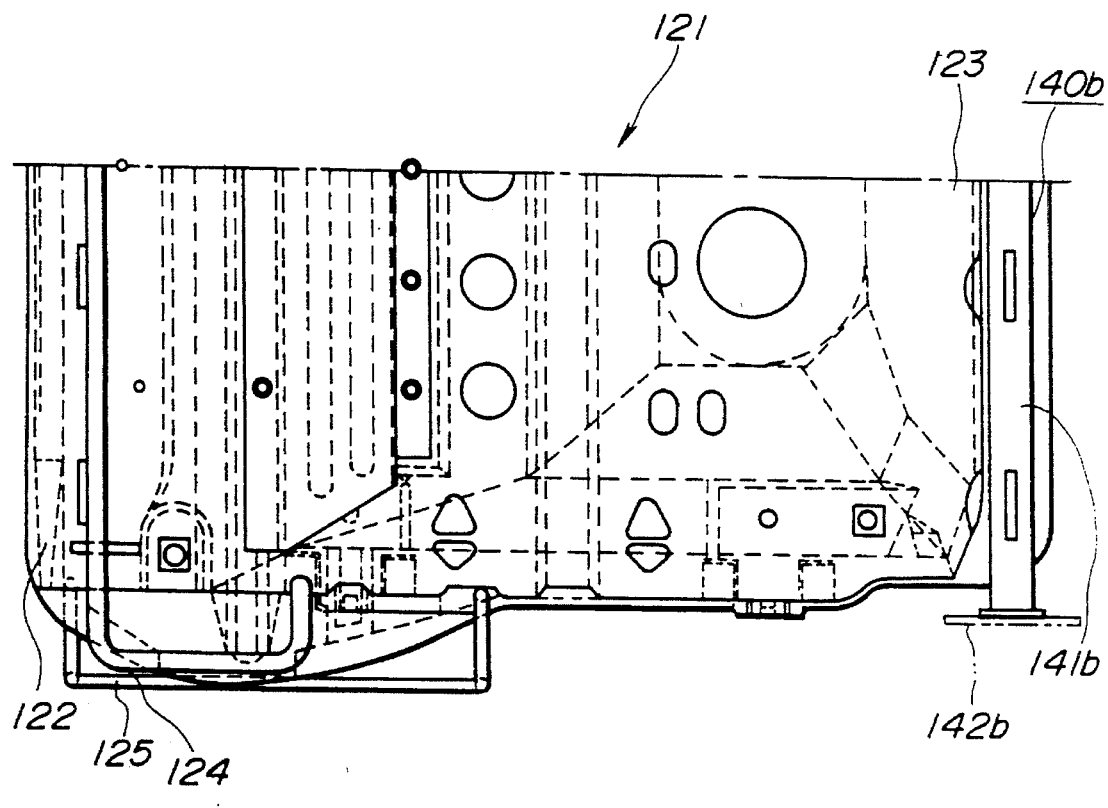
Figure 24:
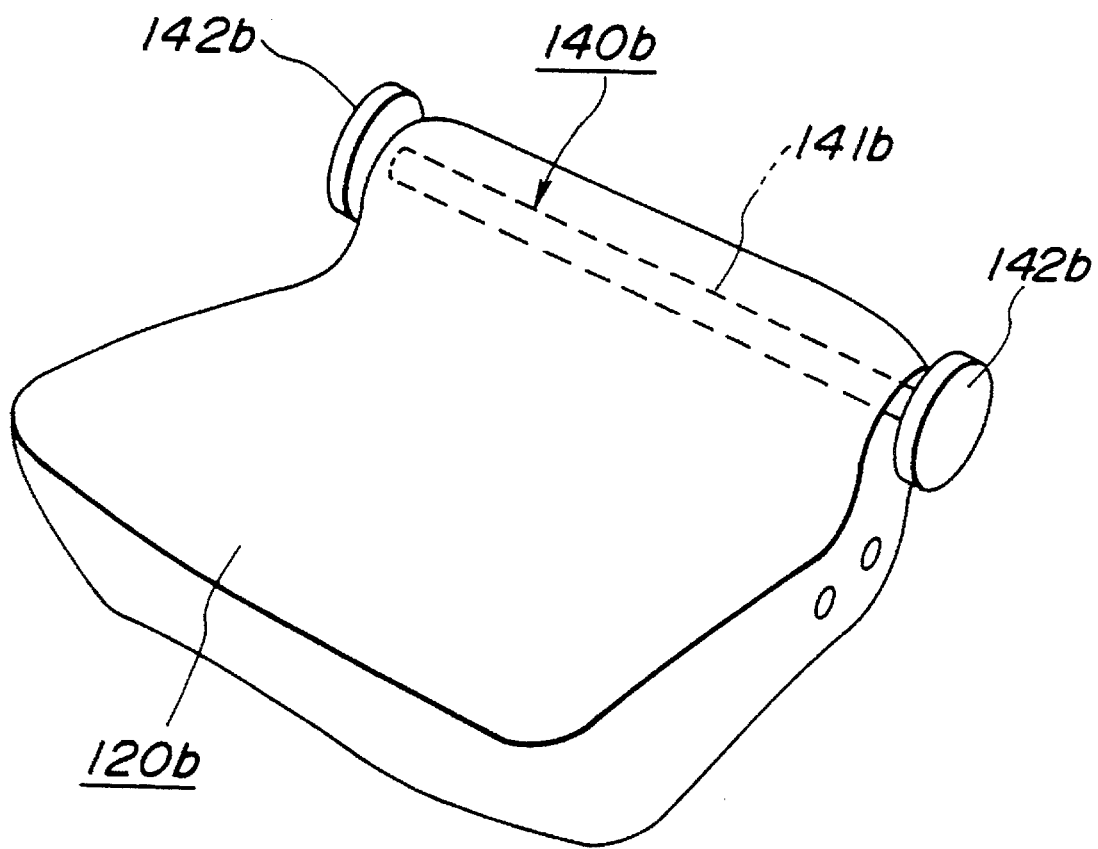

As is seen from FIG. 21, in this fifth embodiment, each circular plate 142b of the reinforcing structure 140b is positioned in the vicinity of the pivot shaft 153 of the reclining device 150 so that the axis of the pivot shaft 153 passes through the circular plate 142b. For achieving this, as is seen from FIG. 22, an eccentric connection is made between the circular plate 142b and the elongate member 141b. As is seen from FIGS. 22 and 23, to front side portions of the cushion frame 121, there are welded frame members 124 by which side portions of a pad member (not shown) of the seat cushion 120b are supported. Furthermore, to front lower sides of the cushion frame 121, there are connected trim wires 125 by which a trim cover (not shown) for the pad member is retained.

Due to provision of the elongate reinforcing structure 140b in the seat cushion 120b, substantially the same advantages as those of the above-mentioned fourth embodiment are obtained in this fifth embodiment.

Figure 25:
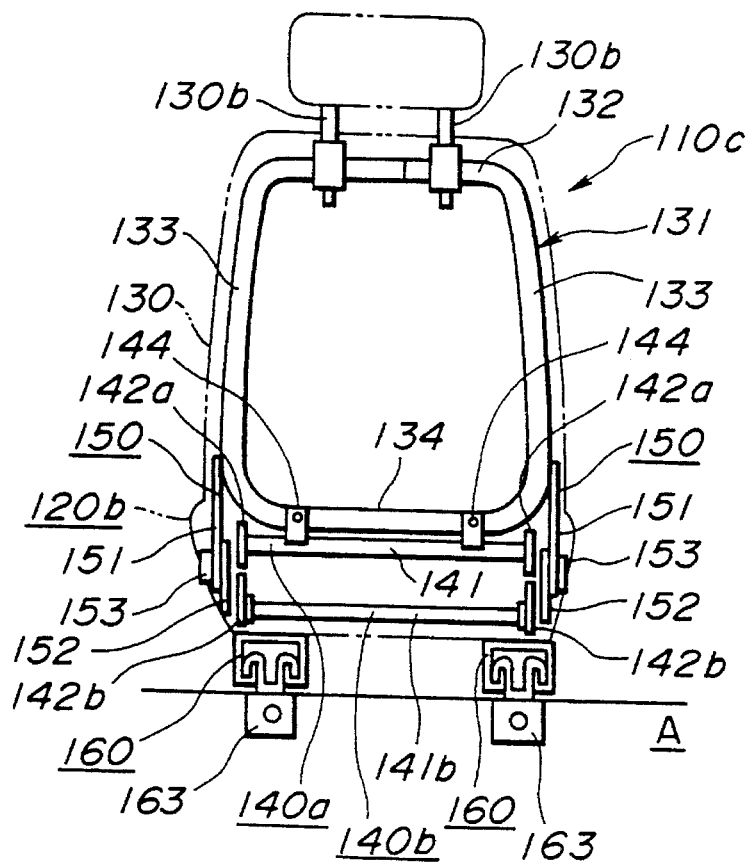
Figure 26:
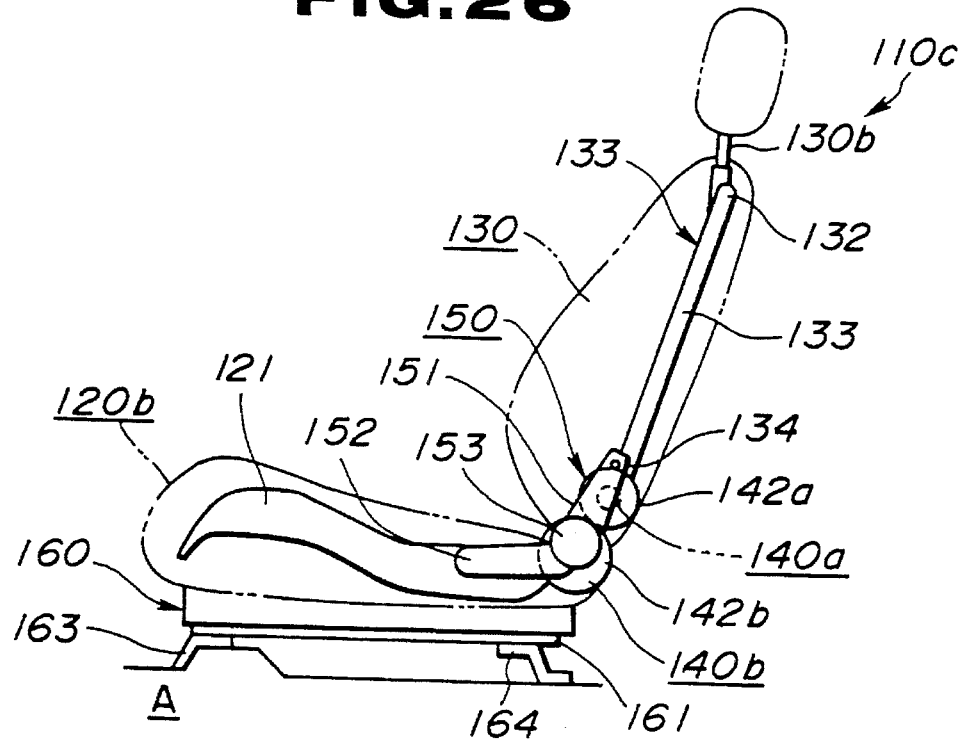

Referring to FIGS. 25 and 26, there is shown a safety seat 110c which is a sixth embodiment of the present invention.

In this sixth embodiment, two reinforcing structures 140a and 140b are used which are respectively mounted to the seatback 130 and the seat cushion 120b in such a manner as has been described in the fourth and fifth embodiments. That is, one reinforcing structure 140a is connected through two brackets 144 to the lower portion 134 of the seatback frame 131, and the other reinforcing structure 140b is connected to the rear portion of the pan frame 121 of the seat cushion 120b.

Due to usage of the two reinforcing structures 140a and 140b, durability of the seat 110c against the side-on vehicle collision is much increased.

Figure 27:
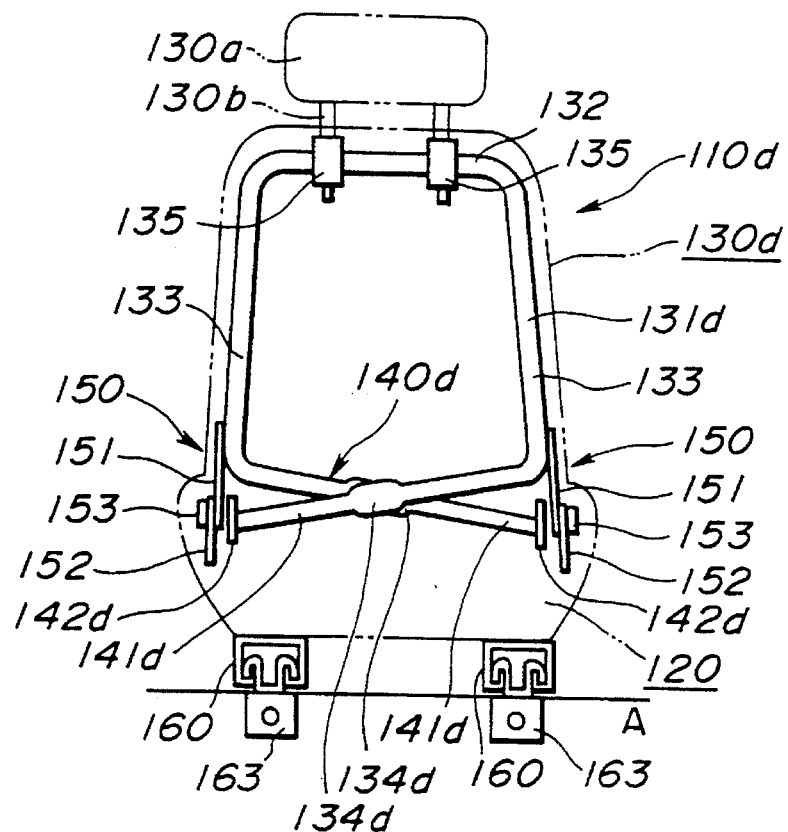
Figure 28:
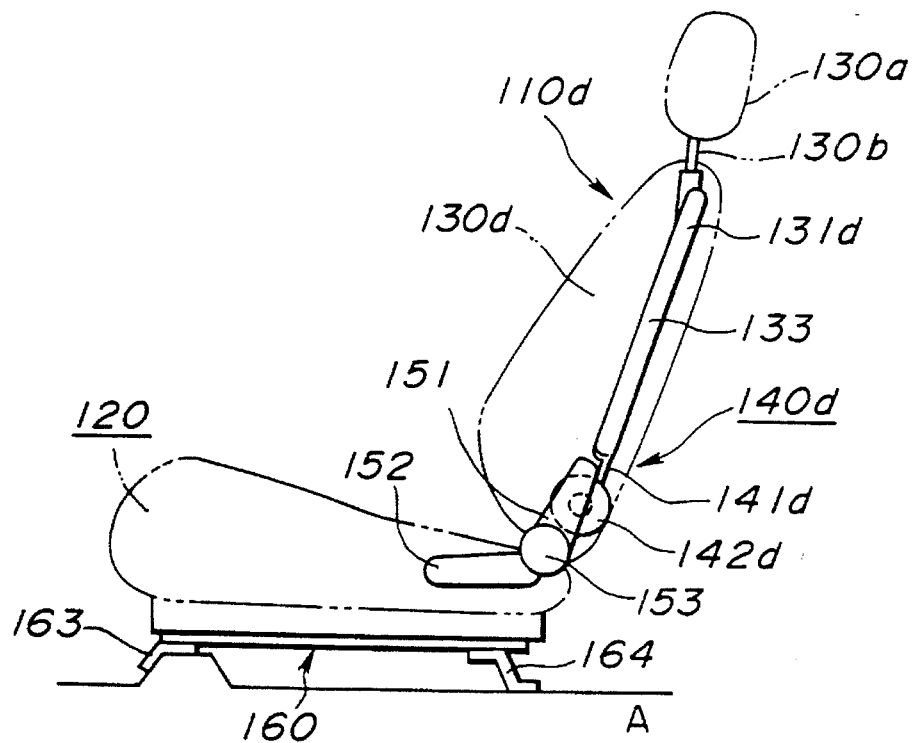

Referring to FIGS. 27 and 28, there is shown a safety seat 110d which is a seventh embodiment of the present invention.

As is understood from FIG. 27, in this seventh embodiment, the back frame 131d of the seatback is constructed of a pipe member and comprises side portions 133, a generally U-shaped upper portion 132 which extends between upper ends of the side portions 133 and two mutually intersecting portions 141d which extend obliquely from lower ends of the side portions 133. The two intersecting portions 141d are welded at their middle portions 134d and have at their leading ends circular plates 142d welded thereto. Each circular plate 142d faces the inside-positioned (or outside-positioned) part of the reclining device 150.

Thus, the mutually intersecting portions 141d and the circular plates 142d constitute a reinforcing structure 140d. Because the reinforcing structure 140d is constructed by a part of the back frame 131d of the seatback 130d, the number of parts of the safety seat 110d can be reduced.

Referring to FIGS. 29 to 32, there is shown a safety seat 110e which is eighth embodiment of the present invention.

Figure 29:
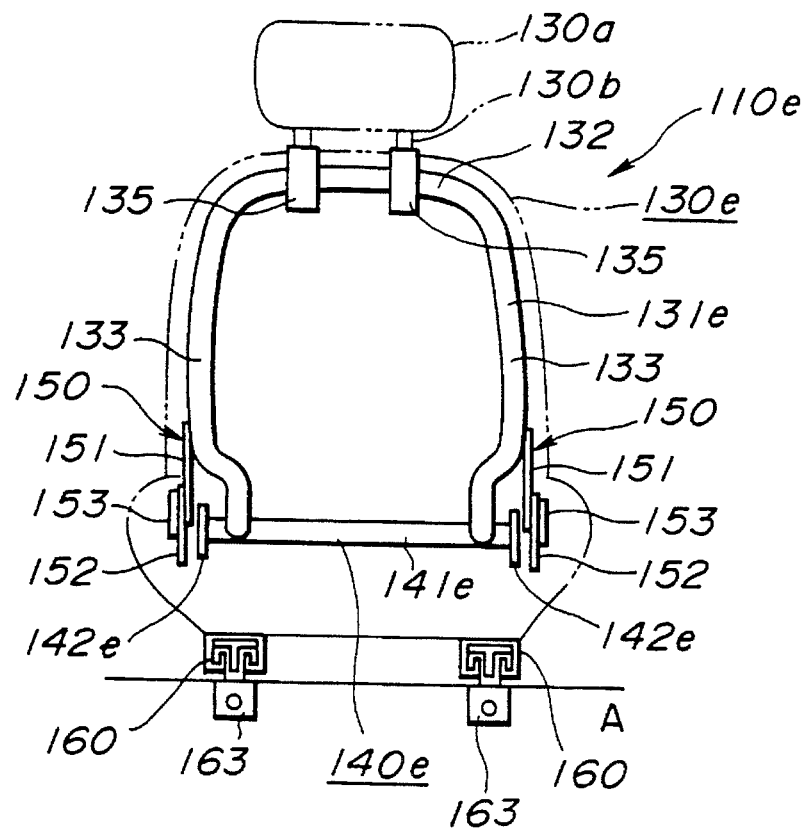
Figure 30:
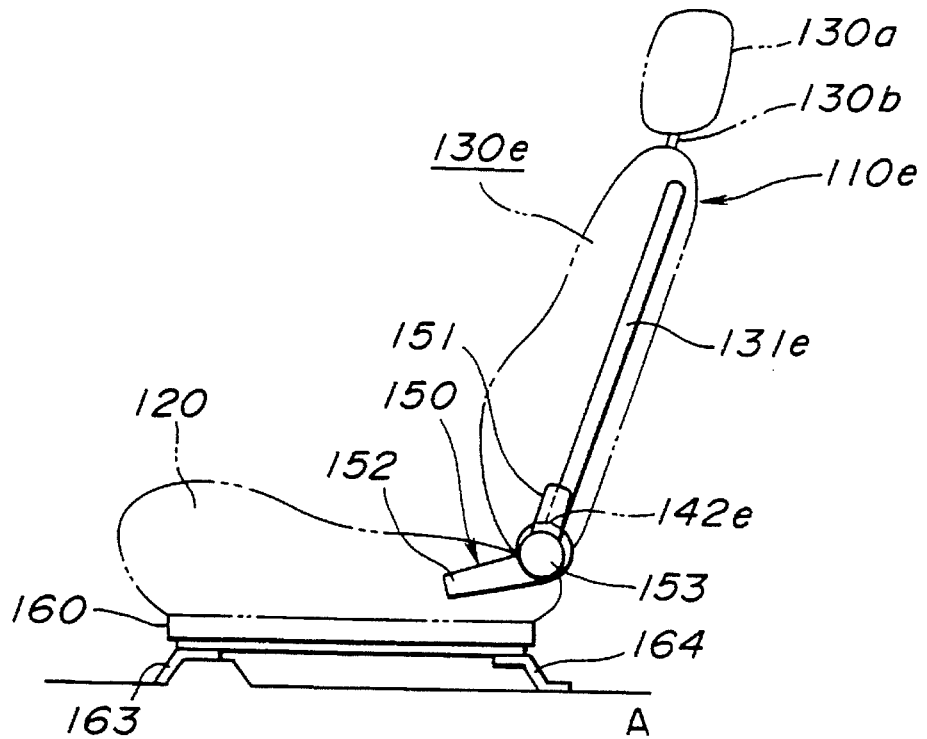
Figure 31:
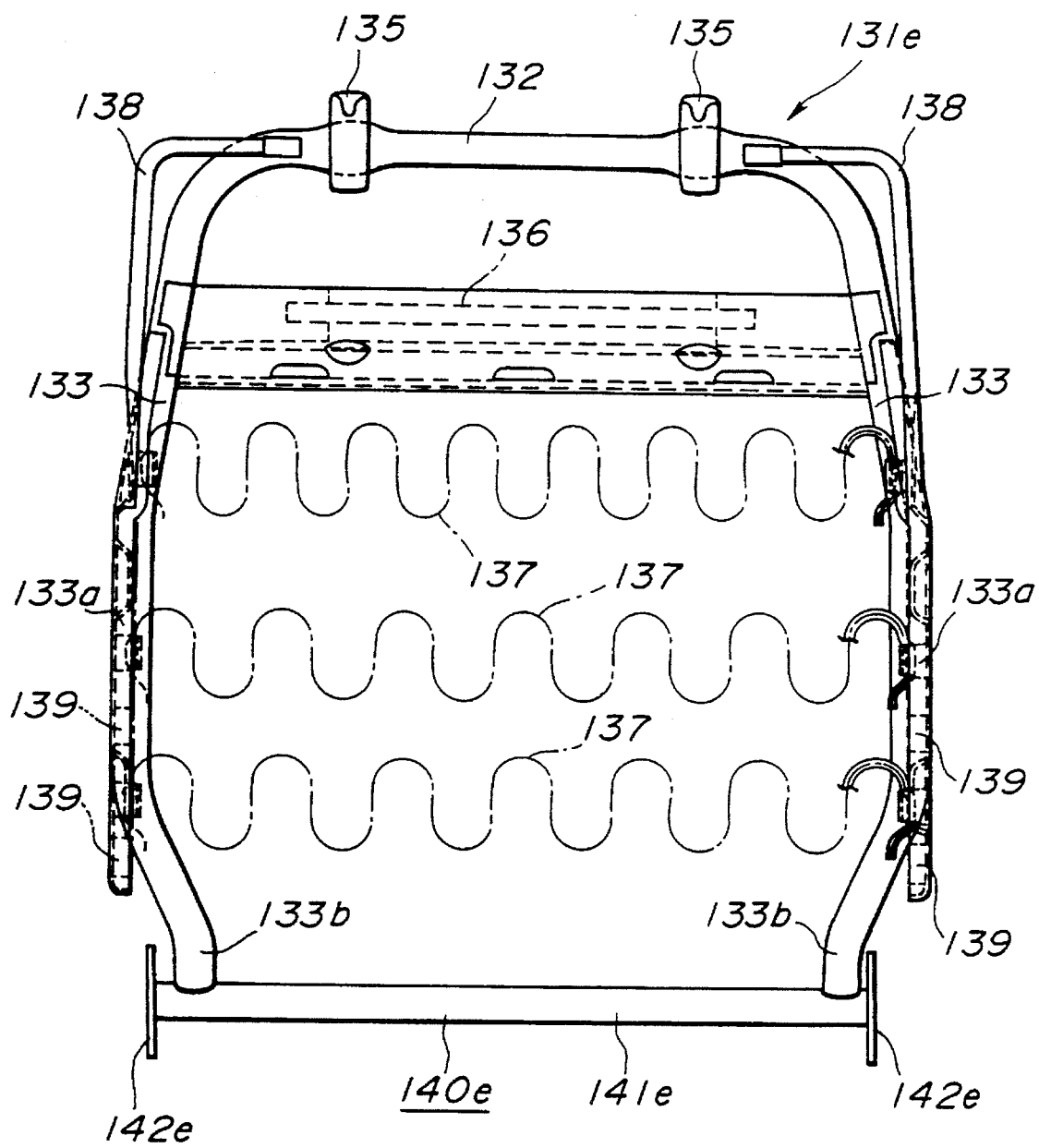
Figure 32:
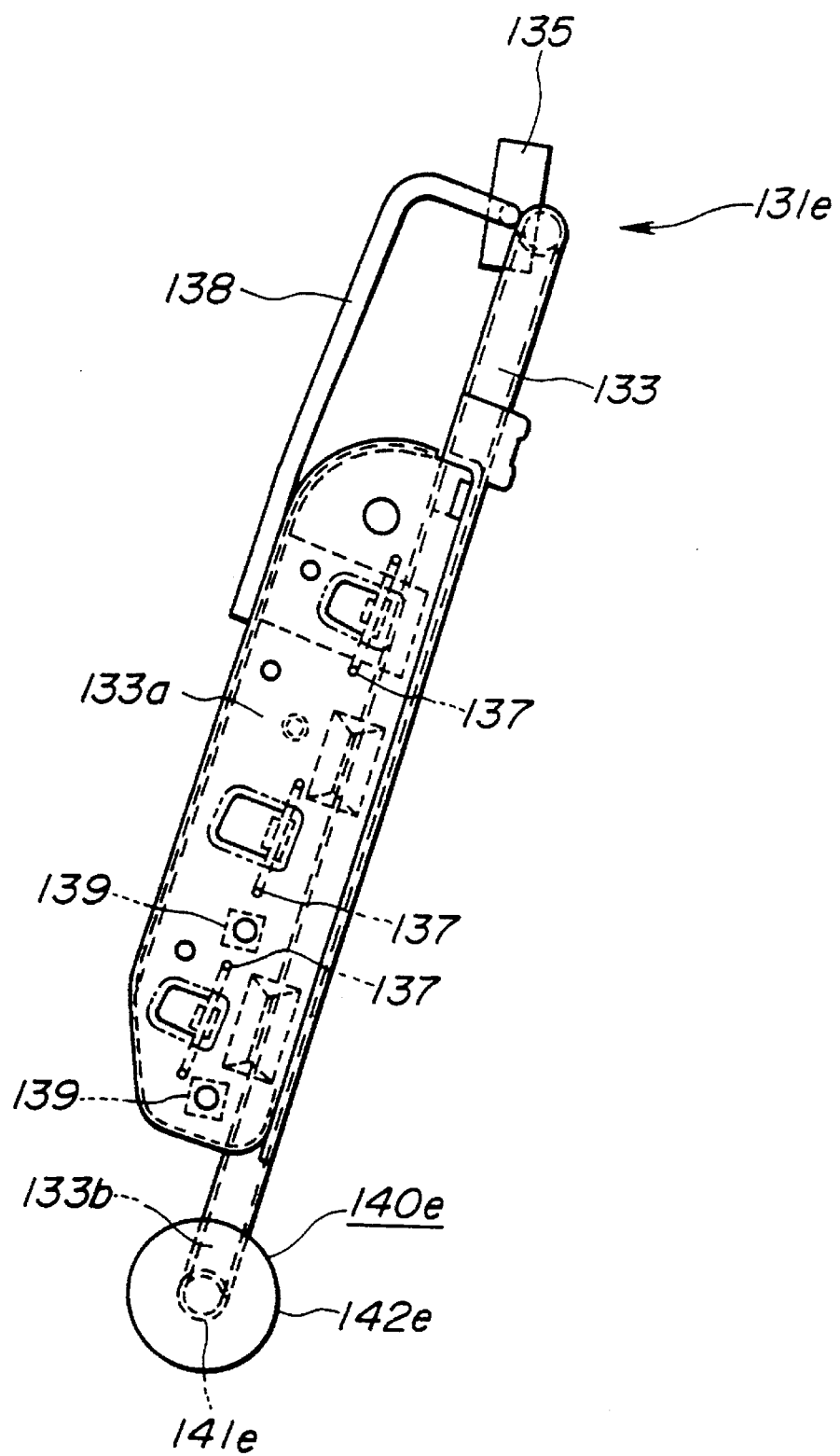

As is well shown in FIGS. 29 and 31, in this embodiment 110e, the side portions 133 of the back frame 131e have inwardly bent lower portions 133b. The bent lower portions 133b have leading ends to which a reinforcing structure 140e is directly fixed. The reinforcing structure 140e comprises a high resiliency elongate member 141e welded to the leading ends of the lower portions 133b and two circular plates 142e welded to respective ends of the elongate member 141e. Of course, each circular plate 142e fades the inside-positioned (or outside-positioned) part of the reclining device 150.

In this embodiment, the elongate member 141e of the reinforcing structure 140e serves as a lower cross portion of the back frame 131e, which reduces the number of parts of the seat 110e.

Figure 33:
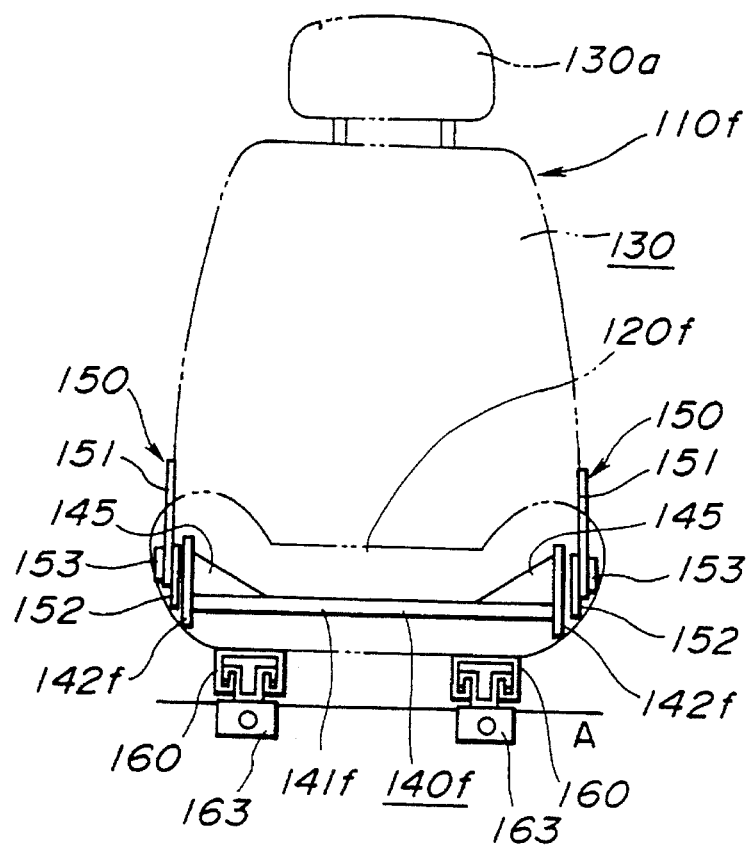
Figure 34:
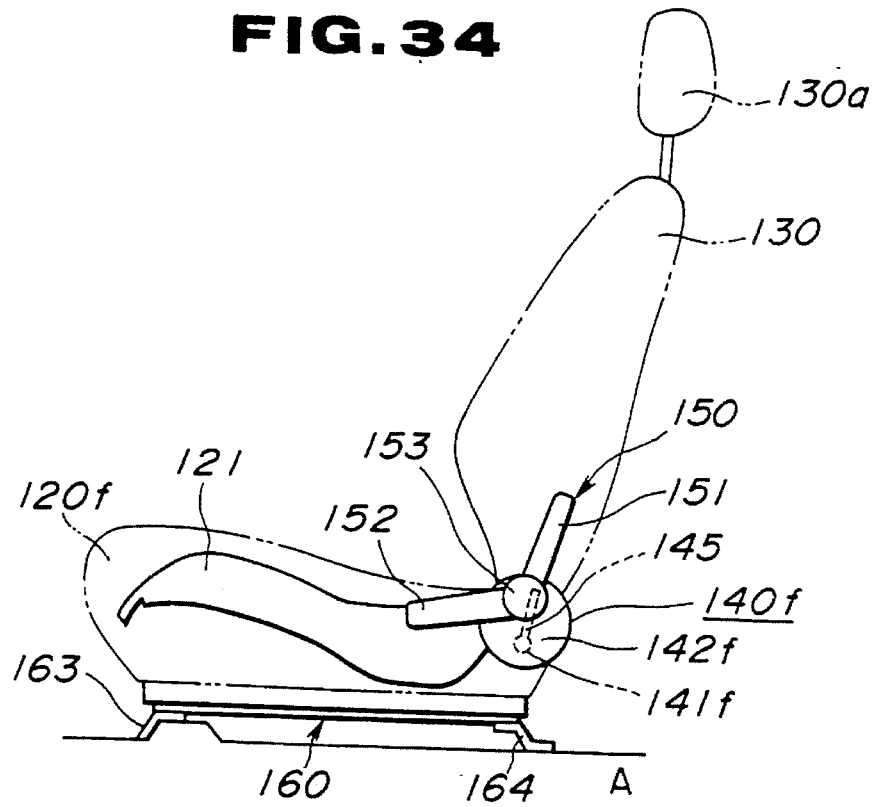

Referring to FIGS. 33 and 34, there is shown a safety seat 110f which is a ninth embodiment of the present invention. The seat 110f of this embodiment is substantially the same as the above-mentioned fifth embodiment 110b except the following.

That is, in this ninth embodiment, two reinforcing ribs 145 are welded to the high resiliency elongate member 141f of the reinforcing structure 140f near the circular plates 142f. Each rib 145 is triangular in shape, as shown. More specifically, two perpendicularly intersecting sides of each rib 145 are welded to the elongate member 141f and the circular plate 142f.

Due to provision of such reinforcing ribs 145, the mechanical strength of the reinforcing structure 140f is increased, and thus the durability of the seat 110f against the side-on vehicle collision is much increased.

Figure 35:
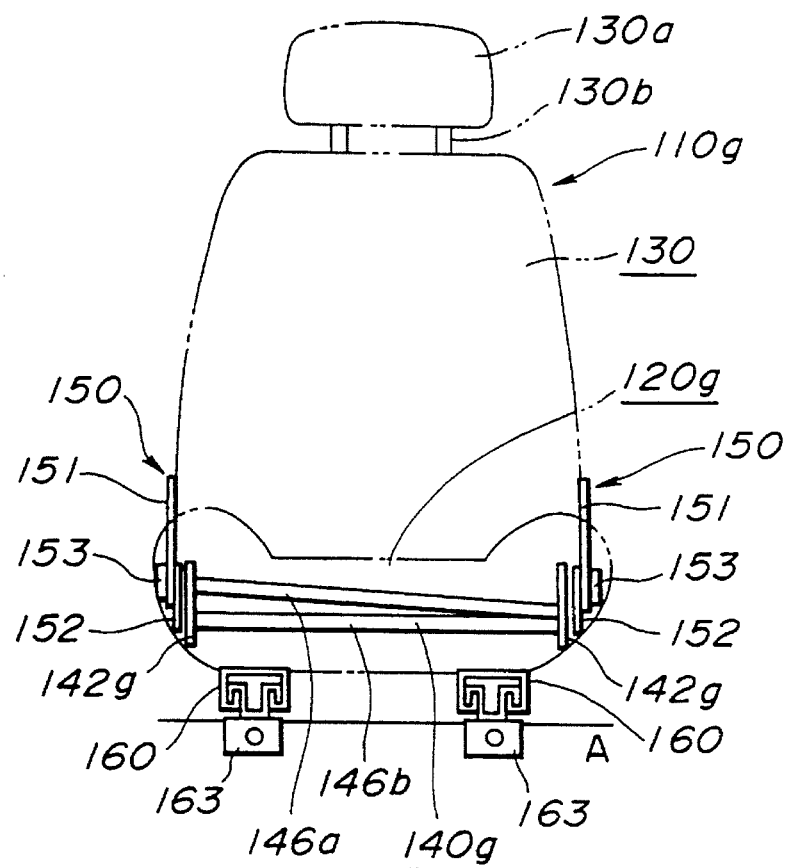
Figure 36:
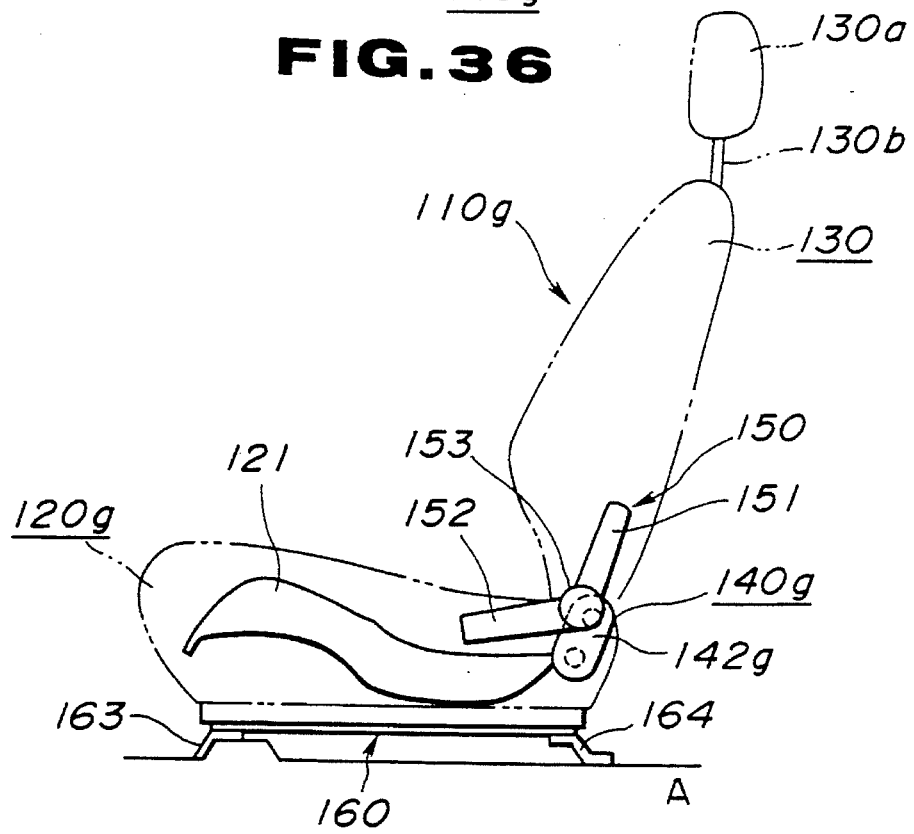
Figure 37:
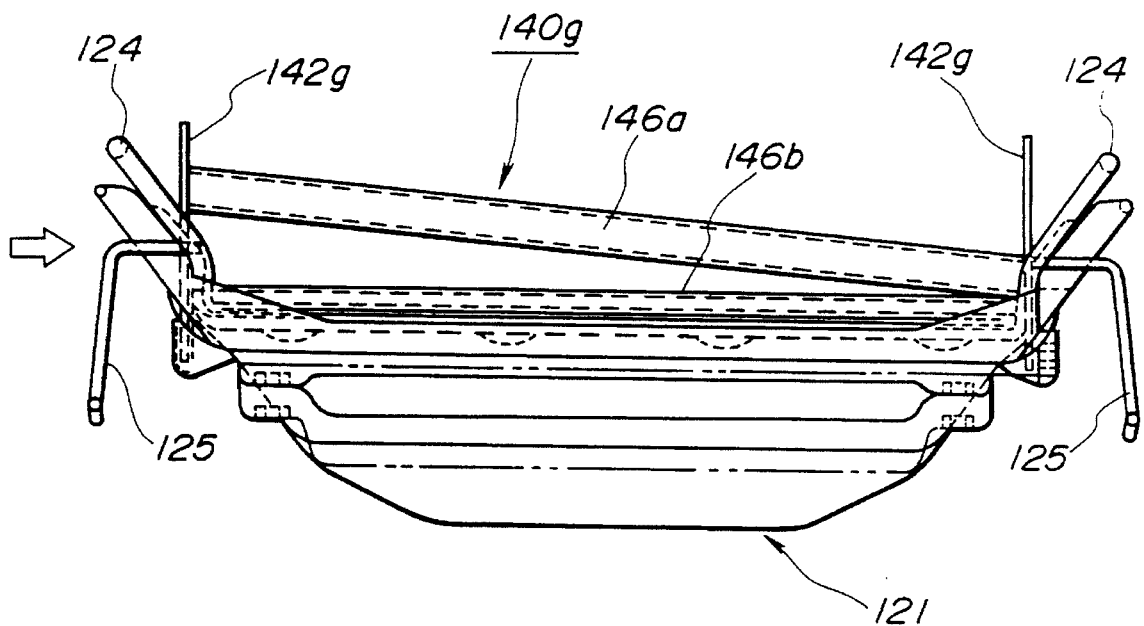
Figure 38:
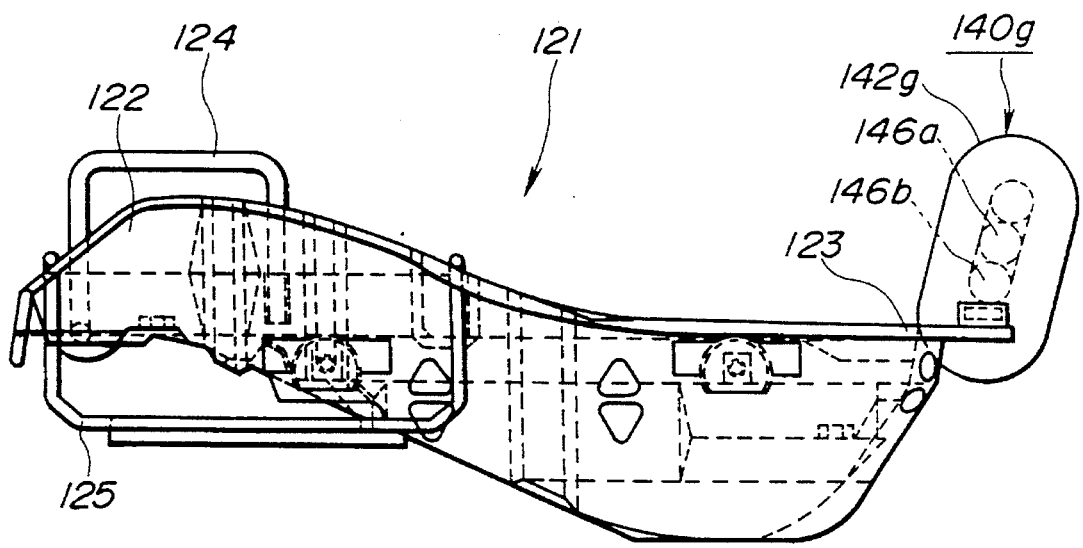

Referring to FIGS. 35 to 37, there is shown a safety seat 110g which is a tenth embodiment of the present invention.

In this embodiment, the reinforcing structure 140g is installed in the seat cushion 120g of the seat 110g. Designated by numeral 121 is the cushion frame of the seat cushion 120g.

As is seen from FIG. 36, the reinforcing structure 140g employed in this embodiment is mounted to a rear end 123 of the cushion frame 121.

As is seen from FIGS. 35 and 37, the reinforcing structure 140g comprises an inclined elongate member 146a and a horizontal elongate member 146b. These two elongate members 146a and 146b are welded to two plates 142g, having circular portions at their respective ends.

When, as is understood from FIG. 37, an abnormally big force is applied to the seat 110g in the direction of the arrow due to a side-on vehicle collision, the force is effectively received by the reinforcing structure 140g thereby preventing the seat 110g from being damaged.

Due to usage of the inclined elongate member 146a, the mechanical strength of the reinforcing structure 140g is much increased.

Figure 39:
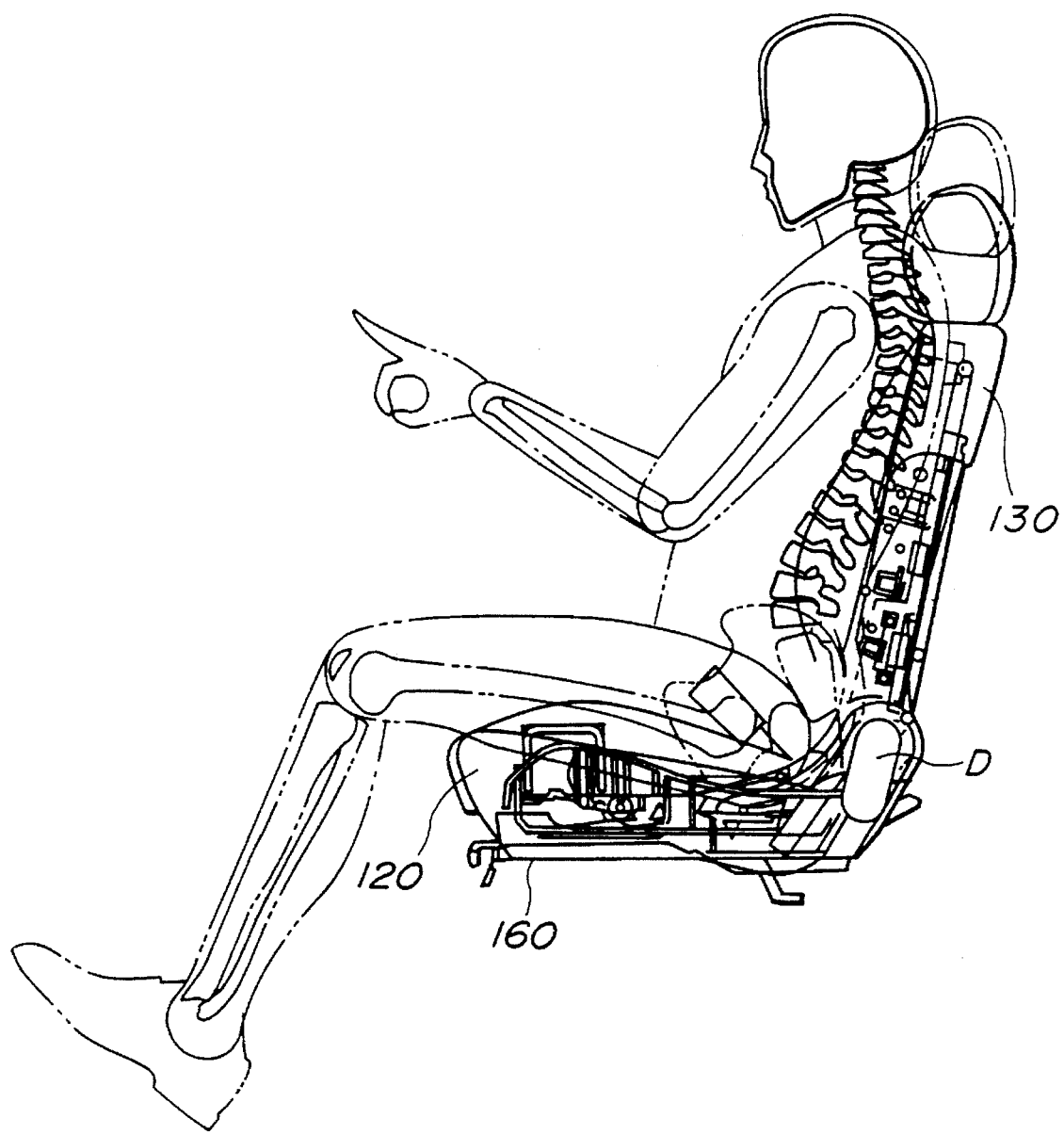
FIG.39 is a drawing of an occupant on a seat, showing a desired area where a reinforcing structure according to the present invention should be positioned.

FIG. 39 shows a region "D" where the reinforcing structures 140a to 140g of the above-mentioned fourth to tenth embodiments should be positioned. As shown, the region "D" includes a rear end portion of the seat cushion 120 and a lower end portion of the seatback 130.

What is claimed is:

1. A safety seat having a reclining means mounted therein, comprising:

a seat cushion including a cushion frame, said seat cushion having a first lateral side, a second lateral side, a front end and a rear end;

a seatback pivotally connected to the rear end of said seat cushion, said seatback including a rectangular seatback frame, said rectangular seatback frame having an upper frame part and a lower frame part;

right and left members which constitute part of said reclining means, said right and left members being respectively arranged at the first and second lateral sides of the rear end of said seat cushion;

a high resiliency elongate member extending along and below the lower frame part of said rectangular seatback frame, each axial end of said high resiliency elongate member being directed toward the corresponding one of said right and left members keeping a clearance therebetween;

securing means for securing said high resiliency elongate member to said lower frame part; and two circular plates respectively secured to the axial ends of said high resiliency elongate member, each circular plate facing the corresponding one of said right and left members with a given clearance therebetween.

2. A safety seat as claimed in claim 1, in which said securing means include brackets through which said high resiliency elongate member is secured to the lower frame part of said rectangular seatback frame.

3. A safety seat as claimed in claim 2, in which each of said circular plates is welded to an end of said high resiliency elongate member and covered with an elastic cover.

4. A safety seat as claimed in claim 3, in which each of said right and left members comprises:

a base member secured to one side of the rear end of said seat cushion;

an arm member pivotally connected to said base member through a pivot shaft, said arm member being secured to a lower end of one side of said seatback frame; and position lock means operatively interposed between said base member and said arm member so that said arm member can be locked at a desired angular position relative to said base member, wherein said arm member is positioned on an axis of said high resiliency elongate member and faces the corresponding circular plate.

5. A safety seat, comprising:

a seat cushion including a seat cushion frame;

a seatback pivotally connected to a rear end of said seat cushion, said seatback including a seatback frame;

reclining means for permitting said seatback to assume a locked desired angular position relative to said seat cushions, said reclining means including a first side and a second side which are respectively arranged at both lateral sides of the rear end of said seat cushion;

a high resiliency elongate member which extends laterally between the first and second sides leaving a clearance between each axial end of said high resiliency elongate member and the corresponding one of the first and second sides;

securing means for securing said high resiliency elongate member to either one of a lower portion of the seatback frame and a rear end of said seat cushion frame;

two circular plates respectively secured to the axial ends of said high resiliency elongate member, each circular plate facing the corresponding one of the first and second sides with a clearance therebetween, wherein said high resiliency elongate member is secured to a rear portion of a pan frame which constitutes a base structure of said seat cushion, and wherein each circular plate is welded to one end of said high resiliency elongate member in a manner to make an eccentric connection therebetween.

6. A safety seat as claimed in claim 5, in which each of the first and second sides comprises:

a base member secured to one side of the rear end of said seat cushion;

an arm member pivotally connected to said base member, said arm member being secured to a lower end of one side of said seatback frame;

a pivot shaft through which said arm member and said base member are pivotally connected; and position lock means operatively interposed between said base member and said arm member so that said arm member can be locked at a desired angular position relative to said base member, wherein said arm member is positioned on an axis of said high resiliency elongate member and thus faces the corresponding circular plate, and wherein an axis of said pivot shaft passes through said circular plates.

7. A safety seat, comprising:

a seat cushion including a seat cushion frame;

a seatback pivotally connected to a rear end of said seat cushion, said seatback including a seatback frame;

reclining means for permitting said seatback to assume a locked desired angular position relative to said seat cushion, said reclining means including a first side and a second side which are respectively arranged at both lateral sides of the rear end of said seat cushion;

a high resiliency elongate member which extends laterally between the first and second sides leaving a clearance between each axial end of said high resiliency elongate member and the corresponding one of the first and second sides, said high resiliency elongate member being secured to a rear portion of a pan frame which constitutes a base structure of said seat cushion;

securing means for securing said high resiliency elongate member to either one of a lower portion of the seatback frame and a rear end of said seat cushion frame, said securing means including brackets through which said high resiliency elongate member is secured to the lower portion of the seatback frame;

two first circular plates respectively secured to the axial ends of said high resiliency elongate member, each first circular plate facing the corresponding one of the first and second sides with a clearance therebetween, each first circular plate being welded to one end of said high resiliency elongate member in a manner to make an eccentric connection therebetween;

a second high resiliency elongate member which extends laterally between said first and second sides leaving a second clearance between each axial end of said second high resiliency elongate member and the corresponding one of the first and second sides, said second high resiliency elongate member being secured to a rear portion of a pan frame which constitutes a base structure of said seat cushion; and two second circular plates respectively secured to the axial ends of said second high resiliency elongate member, each second circular plate facing the corresponding one of the first and second sides with a third clearance therebetween.

8. A safety seat as claimed in claim 7, in which each of the first and second sides comprises:

a base member secured to one side of the rear end of said seat cushion;

an arm member pivotally connected to said base member, said arm member being secured to a lower end of one side of said seatback frame;

a pivot shaft through which said arm member and said base member are pivotally connected; and position locker means operatively interposed between said base member and said arm member so that said arm member can be locked at a desired angular position relative to said base member, wherein said arm member is positioned to partially face both the corresponding circular plate of said high resiliency elongate member and the corresponding second circular plate of said high resiliency elongate member.

9. A safety seat, comprising:

a seat cushion including a seat cushion frame;

a seatback pivotally connected to a rear end of said seat cushion, said seatback including a rectangularly extending seatback frame;

reclining means for permitting said seatback to assume a locked desired angular position relative to said seat cushion, said reclining means including a first and a second side which are respectively arranged at both lateral sides of the rear end of said seat cushion;

a high resiliency elongate member which extends laterally between the first and second sides leaving a clearance between each axial end of said high resiliency elongate member and the corresponding one of the first and second sides;

two brackets through which said high resiliency elongate member is secured to a lower portion of said seatback frame;

two circular plates welded to the axial ends of said high resiliency elongate member, each circular plate facing the corresponding one of the first and second sides with a given clearance therebetween; and two elastic covers respectively covering said circular plates.

10. A safety seat, comprising:

a seat cushion including a pan frame which constitutes a base structure of said seat cushion;

a seatback pivotally connected to a rear end of said seat cushion, said seatback including a seatback frame;

reclining means for permitting said seatback to assume a locked desired angular position relative to said seat cushion, said reclining means including a first side and a second side which are respectively arranged at both lateral sides of the rear end of said seat cushion;

a high resiliency elongate member which extends laterally between the first and second sides leaving a clearance between each axial end of said high resiliency elongate member and the corresponding one of the first and second sides;

means for securing said high resiliency elongate member to a rear end portion of said pan frame of the seat cushion;

two circular plates welded to the axial ends of said high resiliency elongate member, each circular plate facing the corresponding one of the first and second sides with a given clearance therebetween; and two elastic covers respectively covering said circular plates.

11. A safety seat, comprising:

a seat cushion including a pan frame which constitutes a base structure of the seat cushion;

a seatback pivotally connected to a rear end of said seat cushion said seatback including a seatback frame;

reclining means for permitting said seatback to assume a locked desired angular position relative to said seat cushion, said reclining means including a first side and a second side which are respectively arranged at both lateral sides of the rear end of said seat cushion;

a first high resiliency elongate member extending between the first and second sides leaving a clearance between each axial end of said first high resiliency elongate member and the corresponding one of the first and second sides;

two brackets for securing said first high resiliency elongate member to a lower portion of said seatback frame;

two first circular plates respectively secured to the axial ends of said high resiliency first elongate member, each first circular plate facing the corresponding one of first and second sides with a given clearance therebetween;

a second high resiliency elongate member extending substantially in parallel with said first high resiliency elongate member between the first and second sides leaving a second clearance between each axial end of said second high resiliency elongate member and the corresponding one of the first and second sides, said high resiliency second elongate member being secured to a rear end portion of said pan frame of the seat cushion; and two second circular plates respectively secured to the axial ends of said second high resiliency elongate member, each second circular plate facing the corresponding one of the first and second sides with a second given clearance therebetween.

* * * * *